(12) United States Patent
Austin et al.

(10) Patent No.: US 10,787,378 B2
(45) Date of Patent: Sep. 29, 2020

(54) SPIRALLY WOUND ELECTRIC DOUBLE LAYER CAPACITOR DEVICE AND ASSOCIATED METHODS

(71) Applicant: Atlantis Technologies, Dana Point, CA (US)

(72) Inventors: Neil Austin, Las Vegas, NV (US); Lukas Buell, San Clemente, CA (US); Patrick Michael Curran, Laguna Niguel, CA (US); Ryan Gilmore, Dana Point, CA (US); John Ramos, Oceanside, CA (US); Philip Reeder, Torrance, CA (US); Jacob Silverman, Lake Forest, CA (US)

(73) Assignee: Atlantis Technologies, Dana Point, CA (US)

( * ) Notice: Subject to any disclaimer, the term of this patent is extended or adjusted under 35 U.S.C. 154(b) by 0 days.

(21) Appl. No.: 15/993,565

(22) Filed: May 30, 2018

(65) Prior Publication Data

US 2019/0367386 A1 Dec. 5, 2019

(51) Int. Cl.
| | | |
|---|---|---|
| *C02F 1/46* | (2006.01) | |
| *C02F 1/469* | (2006.01) | |
| *H01G 11/78* | (2013.01) | |
| *H01G 11/84* | (2013.01) | |
| *H01G 11/10* | (2013.01) | |

(52) U.S. Cl.
CPC ........... *C02F 1/4691* (2013.01); *H01G 11/10* (2013.01); *H01G 11/78* (2013.01); *H01G 11/84* (2013.01)

(58) Field of Classification Search
CPC ....... C02F 1/4691; H01G 11/78; H01G 11/10; H01G 11/84
See application file for complete search history.

(56) References Cited

U.S. PATENT DOCUMENTS

| | | |
|---|---|---|
| 3,281,511 A | 10/1966 | Goldsmith |
| 3,890,417 A | 6/1975 | Vallance |
| 4,153,661 A | 5/1979 | Ree et al. |
| 4,320,185 A | 3/1982 | Bernstein et al. |
| 4,337,140 A | 6/1982 | Solomon |
| 4,379,772 A | 4/1983 | Solomon et al. |
| 4,556,618 A | 12/1985 | Shia |
| 4,862,328 A | 8/1989 | Morimoto et al. |
| 5,145,585 A | 9/1992 | Coke |
| 5,192,432 A | 3/1993 | Andelman |

(Continued)

FOREIGN PATENT DOCUMENTS

| | | |
|---|---|---|
| EP | 2 409 955 A1 | 1/2012 |
| EP | 2 607 321 A1 | 6/2013 |

(Continued)

OTHER PUBLICATIONS

International Search Report and Written Opinion for PCT/US2018/035226 dated Sep. 13, 2018 with pending claims.

(Continued)

*Primary Examiner* — Arun S Phasge
(74) *Attorney, Agent, or Firm* — Wolf, Greenfield & Sacks, P.C.

(57) ABSTRACT

Spirally wound electric double layer capacitor devices are generally disclosed. In some embodiments, the spirally wound electric double layer capacitor device is configured so that fluid being treated flows in an axial direction through the device.

7 Claims, 15 Drawing Sheets

(56) References Cited

U.S. PATENT DOCUMENTS

| | | |
|---|---|---|
| 5,196,115 A | 3/1993 | Andelman |
| 5,200,068 A | 4/1993 | Andelman |
| 5,260,855 A | 11/1993 | Kaschmitter et al. |
| 5,360,540 A | 11/1994 | Andelman |
| 5,415,768 A | 5/1995 | Andelman |
| 5,425,858 A | 6/1995 | Farmer |
| 5,476,878 A | 12/1995 | Pekala |
| 5,508,341 A | 4/1996 | Mayer et al. |
| 5,538,611 A | 7/1996 | Otowa |
| 5,547,581 A | 8/1996 | Andelman |
| 5,620,597 A | 4/1997 | Andelman |
| 5,626,977 A | 5/1997 | Mayer et al. |
| 5,636,437 A | 6/1997 | Kaschmitter et al. |
| 5,731,360 A | 3/1998 | Pekala et al. |
| 5,748,437 A | 5/1998 | Andelman |
| 5,779,891 A | 7/1998 | Andelman |
| 5,932,185 A | 8/1999 | Pekala et al. |
| 5,954,937 A | 9/1999 | Farmer |
| 6,072,692 A | 6/2000 | Hiratusuka et al. |
| 6,127,474 A | 10/2000 | Andelman |
| 6,309,532 B1 | 10/2001 | Tran et al. |
| 6,325,907 B1 | 12/2001 | Andelman |
| 6,346,187 B1 | 2/2002 | Tran et al. |
| 6,413,409 B1 | 7/2002 | Otowa et al. |
| 6,628,505 B1 | 9/2003 | Andelman |
| 6,709,560 B2 | 3/2004 | Andelman et al. |
| 6,761,809 B2 | 7/2004 | Tran et al. |
| 6,778,378 B1 | 8/2004 | Andelman |
| 6,781,817 B2 | 8/2004 | Andelman |
| 7,138,042 B2 | 11/2006 | Tran et al. |
| 7,175,783 B2 | 2/2007 | Curran et al. |
| 7,368,191 B2 | 5/2008 | Andelman et al. |
| 8,470,152 B2 | 6/2013 | Sullivan |
| 8,685,255 B2 | 4/2014 | Knapp et al. |
| 8,730,650 B2 | 5/2014 | Reinhoudt et al. |
| 8,865,351 B2 | 10/2014 | Mayes et al. |
| 8,968,544 B2 | 3/2015 | Van Limpt et al. |
| 9,067,216 B2 | 6/2015 | Reinhoudt et al. |
| 9,096,451 B2 | 8/2015 | Van Der Wal et al. |
| 9,193,612 B2 | 11/2015 | Curran |
| 9,365,440 B2 | 6/2016 | Van Der Wal et al. |
| 9,540,260 B2 | 1/2017 | Reinhoudt et al. |
| 9,633,798 B2 | 4/2017 | Curran |
| 9,637,399 B2 | 5/2017 | Van Der Wal et al. |
| 9,859,066 B2 | 1/2018 | Curran |
| 10,202,294 B2 | 2/2019 | Curran |
| 10,650,985 B2 | 5/2020 | Curran |
| 2002/0017463 A1 | 2/2002 | Merida-Donis et al. |
| 2002/0084188 A1 | 7/2002 | Tran et al. |
| 2003/0161781 A1 | 8/2003 | Cabasso et al. |
| 2004/0076885 A1 | 4/2004 | Sato et al. |
| 2004/0170821 A1 | 9/2004 | Iwaida et al. |
| 2005/0103634 A1 | 5/2005 | Andelman et al. |
| 2006/0029857 A1 | 2/2006 | Cherepy et al. |
| 2006/0049105 A1 | 3/2006 | Max |
| 2006/0288743 A1 | 12/2006 | van Kralingen et al. |
| 2007/0053141 A1 | 3/2007 | Fujino |
| 2007/0075300 A1 | 4/2007 | Curran et al. |
| 2007/0158185 A1 | 7/2007 | Andelman et al. |
| 2007/0170060 A1 | 7/2007 | Bourcier et al. |
| 2008/0078673 A1 | 4/2008 | Elson et al. |
| 2008/0223795 A1 | 9/2008 | Bakajin et al. |
| 2009/0114598 A1 | 5/2009 | Van Kralingen et al. |
| 2009/0218227 A1 | 9/2009 | Noh et al. |
| 2010/0025247 A1 | 2/2010 | Daily, III |
| 2010/0065438 A1 | 3/2010 | Sullivan |
| 2010/0102009 A1 | 4/2010 | Silva |
| 2010/0216023 A1 | 8/2010 | Wei et al. |
| 2010/0230277 A1 | 9/2010 | Sullivan et al. |
| 2010/0300287 A1 | 12/2010 | Aines et al. |
| 2010/0328841 A1 | 12/2010 | Reinhoudt et al. |
| 2011/0056843 A1* | 3/2011 | Curran ............ C02F 1/46104 205/742 |
| 2011/0132762 A1 | 6/2011 | O'Brien et al. |
| 2011/0240474 A1 | 10/2011 | Seed et al. |
| 2012/0103818 A1 | 5/2012 | Reinhoudt et al. |
| 2012/0125776 A1 | 5/2012 | Van Der Wal et al. |
| 2012/0138470 A1 | 6/2012 | Van Der Wal et al. |
| 2012/0214219 A1 | 8/2012 | Aines et al. |
| 2012/0217170 A1 | 8/2012 | Van Der Wal et al. |
| 2012/0273359 A1 | 11/2012 | Suss et al. |
| 2013/0075260 A1 | 3/2013 | Reinhoudt et al. |
| 2013/0098766 A1 | 4/2013 | Van Der Wal et al. |
| 2013/0105399 A1 | 5/2013 | Aines et al. |
| 2013/0105406 A1 | 5/2013 | Van Der Wal et al. |
| 2013/0146463 A1 | 6/2013 | Van Der Wal et al. |
| 2013/0153423 A1 | 6/2013 | Van Der Wal et al. |
| 2013/0186761 A1 | 7/2013 | Van Der Wal et al. |
| 2013/0213870 A1 | 8/2013 | Tempest et al. |
| 2013/0284601 A1 | 10/2013 | Van Der Wal et al. |
| 2014/0034501 A1 | 2/2014 | Van Der Wal et al. |
| 2014/0048418 A1 | 2/2014 | Van Der Wal et al. |
| 2014/0190838 A1 | 7/2014 | Curran |
| 2014/0197102 A1 | 7/2014 | Van Der Wal et al. |
| 2014/0238862 A1 | 8/2014 | Van Der Wal et al. |
| 2014/0339099 A1 | 11/2014 | Van Der Wal et al. |
| 2014/0346046 A1 | 11/2014 | Andelman |
| 2015/0072267 A1 | 3/2015 | Suss et al. |
| 2016/0042880 A1 | 2/2016 | Curran |
| 2016/0083274 A1 | 3/2016 | Curran |
| 2016/0207800 A1 | 7/2016 | Seo et al. |
| 2016/0326025 A1 | 11/2016 | Choi et al. |
| 2016/0332897 A1 | 11/2016 | Van Der Wal et al. |
| 2017/0001885 A1 | 1/2017 | Verschueren |
| 2017/0032900 A9 | 2/2017 | Curran |
| 2017/0129791 A1 | 5/2017 | Van Der Wal et al. |
| 2017/0144902 A1 | 5/2017 | Stadermann et al. |
| 2017/0200566 A1 | 7/2017 | Stadermann et al. |
| 2018/0111854 A1 | 4/2018 | Stadermann et al. |
| 2018/0134588 A1 | 5/2018 | Hunter et al. |
| 2018/0151306 A1 | 5/2018 | Curran |
| 2018/0155221 A1 | 6/2018 | Curran et al. |
| 2018/0162752 A1 | 6/2018 | Van Der Wal et al. |
| 2018/0282183 A1 | 10/2018 | Curran et al. |
| 2019/0228920 A1 | 7/2019 | Curran |

FOREIGN PATENT DOCUMENTS

| | | |
|---|---|---|
| EP | 2 980 027 A1 | 2/2016 |
| EP | 3 037 389 A1 | 6/2016 |
| GB | 1 453 565 A | 10/1976 |
| JP | 2003-200164 A | 7/2003 |
| WO | WO 2006/079417 A1 | 8/2006 |
| WO | WO 2009/062872 A1 | 5/2009 |
| WO | WO 2010/030383 A1 | 3/2010 |
| WO | WO 2010/030384 A1 | 3/2010 |
| WO | WO 2010/030385 A1 | 3/2010 |
| WO | WO 2010/131951 A1 | 11/2010 |
| WO | WO 2011/056066 A1 | 5/2011 |
| WO | WO 2011/072400 A1 | 6/2011 |
| WO | WO 2011/135048 A1 | 11/2011 |
| WO | WO 2012/074397 A1 | 6/2012 |
| WO | WO 2012/129532 A1 | 9/2012 |
| WO | WO 2013/055220 A1 | 4/2013 |
| WO | WO 2013/063567 A2 | 5/2013 |
| WO | WO 2013/098193 A1 | 7/2013 |
| WO | WO 2015/118036 A1 | 8/2015 |
| WO | WO 2016/001325 A2 | 1/2016 |
| WO | WO 2016/016313 A1 | 2/2016 |
| WO | WO 2016/001325 A9 | 11/2016 |
| WO | WO 2016/193166 A1 | 12/2016 |

OTHER PUBLICATIONS

Kenny et al., Basic Water Treatment of Steam Boilers. Western Dry Kiln Association. May 2000:8 pages.

Kuran et al., Flow Through Capacitor Technology. The International Workshop on Marine Pollution and the Impact of Seawater Desalination Plants on the Coastal Environment, Dubai, UAE, Dec. 1-3, 2003, pp. 1-15.

Lee et al., Desalination of a thermal power plant wastewater by membrane capacitive deionization. Desalination. Sep. 5, 2006;196(1-3):125-34.

(56) References Cited

OTHER PUBLICATIONS

Liu et al., Research of the Operating Parameters from Reducing Industrial Water Conductivity through Electro Sorption Technology. Applied Mechanics and Materials. Nov. 2012;229-31:2522-6.
Van Limpt et al., Water and chemical savings in cooling towers by using membrane capacitive deionization. Desalination. Jun. 2, 2014;342:148-55.
PCT/US2018/035226, dated Jun. 4, 2020, International Preliminary Report on Patentability and Claims Pending.
Non-Final Office Action for U.S. Appl. No. 15/839,725 dated Apr. 6, 2020 and Claims Pending as of Dec. 23, 2019.
International Preliminary Report on Patentability for International App. No. PCT/US2018/035226 dated Jun. 4, 2020 and Claims Pending.
U.S. Appl. No. 16/542,613, filed Aug. 16, 2019, Curran.
U.S. Appl. No. 16/112,424, filed Aug. 24, 2018, Curran.
U.S. Appl. No. 15/821,522, filed Nov. 22, 2017, Curran et al.
U.S. Appl. No. 15/839,725, filed Dec. 12, 2017, Curran et al.
PCT/US2018/035226, dated Sep. 13, 2018, International Search Report and Written Opinion with pending claims.

\* cited by examiner

SPIRALLY WOUND ELECTRIC DOUBLE LAYER CAPACITOR DEVICE AND ASSOCIATED METHODS

FIELD

Articles and methods involving electric double layer capacitor devices are generally disclosed.

BACKGROUND

Electric double layer capacitor devices can be useful for removing ions from water. However, many conventional electric double layer capacitor devices are challenging to fabricate, bulky and difficult to scale, operate at a high pressure drop, operate at a low flux rate, have limited capacity, and/or have a limited lifetime. Accordingly, improved electric double layer capacitor devices would be beneficial.

SUMMARY

The subject matter of the present invention involves, in some cases, interrelated products, alternative solutions to a particular problem, and/or a plurality of different uses of one or more systems and/or articles.

In one set of embodiments, an electric double layer capacitor device for use in treating an aqueous stream by capacitive deionization is disclosed. The electric double layer capacitor device comprises an inlet to receive the aqueous stream, an outlet for delivering a treated aqueous stream, and one or more capacitors positioned within a housing and defining a flow path between and in fluid communication with the inlet and the outlet and configured to produce the treated aqueous stream. Each of the one or more capacitors comprises a first electrode, a first ion specific layer associated with the first electrode, a second electrode spaced apart from the first electrode, a second ion specific layer associated with the second electrode, and a dielectric spacer forming the flow path positioned between the first ion specific layer and the second ion specific layer. The dielectric spacer is configured to receive a portion of the aqueous stream from the inlet and deliver a portion of the treated aqueous stream to the outlet. The one or more capacitors form a cylindrical spiral having a centrally disposed axis about which the one or more capacitors are wound. The inlet, outlet, and one or more capacitors are configured to cause the aqueous stream to flow within the flow path between the first ion specific layer and the second ion specific layer in an axial direction from the inlet to the outlet through the flow path.

In some embodiments, an electric double layer capacitor device comprises an inlet to receive an aqueous stream, an outlet for delivering a treated aqueous stream, and at least a first capacitor and a second capacitor positioned within a housing and defining a flow path between and in fluid communication with the inlet and the outlet and configured to produce the treated aqueous stream. Each of the first and second capacitors comprises a first electrode, a first ion specific layer associated with the first electrode, a second electrode spaced apart from the first electrode, a second ion specific layer associated with the second electrode, and a dielectric spacer forming the flow path positioned between the first ion specific layer and the second ion specific layer. The dielectric spacer is configured to receive a portion of the aqueous stream from the inlet and deliver a portion of the treated aqueous stream to the outlet. The first and second capacitors form a cylindrical spiral having a centrally disposed axis about which the one or more capacitors are wound. The first and second capacitors as arranged in the cylindrical spiral form a layer structure such that the first electrode of the first capacitor is in electrical contact with the first electrode of the second capacitor and the second electrode of the first capacitor is in electrical contact with the second electrode of the first capacitor.

In some embodiments, an electric double layer capacitor device comprises a cylindrical housing enclosing a volume, a water-impermeable inner tubular mandrel defining a lumen, an inlet to receive the aqueous stream from a source and to direct the aqueous stream into the volume, an outlet for delivering the treated aqueous stream out of the volume to a destination, and one or more capacitors defining a flow path between and in fluid communication with the inlet and the outlet and configured to produce a treated aqueous stream. The volume is bounded by an outer cylindrical surface and contains the one or more capacitors. The inlet is positioned within the lumen and penetrating the water-impermeable inner tubular mandrel. The outlet is positioned within the lumen and penetrating the water-impermeable inner tubular mandrel. Each of the one or more capacitors comprises a first electrode, a first ion specific layer associated with the first electrode, a second electrode spaced apart from the first electrode, a second ion specific layer associated with the second electrode, and a dielectric spacer forming the flow path positioned between the first ion specific layer and the second ion specific layer. The one or more capacitors form a cylindrical spiral having a centrally disposed axis about which the one or more capacitors are wound.

In some embodiments, an electric double layer capacitor device comprises an inlet to receive an aqueous stream, an outlet for delivering a treated aqueous stream, and one or more capacitors positioned within a housing and defining a flow path between and in fluid communication with the inlet and the outlet and configured to produce the treated aqueous stream. Each of the one or more capacitors comprises a first electrode, a first ion specific layer associated with the first electrode, a second electrode spaced apart from the first electrode, a second ion specific layer associated with the second electrode, and a dielectric spacer forming the flow path positioned between the first ion specific layer and the second ion specific layer. The dielectric spacer is configured to receive a portion of the aqueous stream from the inlet and deliver a portion of the treated aqueous stream to the outlet. The dielectric spacer has a thickness of greater than or equal to 125 microns. The one or more capacitors form a cylindrical spiral having a centrally disposed axis about which the one or more capacitors are wound.

In some embodiments, an electric double layer capacitor device comprises an inlet to receive an aqueous stream, an outlet for delivering a treated aqueous stream, and one or more capacitors positioned within a housing and defining a flow path between and in fluid communication with the inlet and the outlet and configured to produce the treated aqueous stream. Each of the one or more capacitors comprises a first electrode, a first ion specific layer associated with the first electrode, a second electrode spaced apart from the first electrode, a second ion specific layer associated with the second electrode, and a dielectric spacer forming the flow path positioned between the first ion specific layer and the second ion specific layer. The dielectric spacer is configured to receive a portion of the aqueous stream from the inlet and deliver a portion of the treated aqueous stream to the outlet. A pressure drop from the inlet to the outlet is less than or equal to 0.25 psi per square meter of a cross-sectional area of the flow path for a volumetric flow rate of the aqueous stream through the electric double layer capacitor device of at least 10 gpm, wherein the one or more capacitors of the electric double layer capacitor device have an active area of at least 12 m$^2$. The one or more capacitors form a cylindrical spiral having a centrally disposed axis about which the one or more capacitors are wound.

In some embodiments, an electric double layer capacitor device comprises an inlet to receive an aqueous stream, an outlet for delivering a treated aqueous stream, one or more capacitors positioned within a housing and defining a flow path between and in fluid communication with the inlet and the outlet and configured to produce the treated aqueous stream, and a water-impermeable mandrel. Each of the one or more capacitors comprises a first electrode, a first ion specific layer associated with the first electrode, a second electrode spaced apart from the first electrode, a second ion specific layer associated with the second electrode, and a dielectric spacer forming the flow path positioned between the first ion specific layer and the second ion specific layer. The dielectric spacer is configured to receive a portion of the aqueous stream from the inlet and deliver a portion of the treated aqueous stream to the outlet. The one or more capacitors form a spiral around the water-impermeable mandrel.

In another set of embodiments, a method of forming an electric double layer capacitor device for use in treating an aqueous stream by capacitive deionization is disclosed. The method comprises winding at least a first capacitor disposed on a second capacitor to form a cylindrical spiral. Each of the first and second capacitors comprises a first electrode, a first ion specific layer associated with the first electrode, a second electrode spaced apart from the first electrode, a second ion specific layer associated with the second electrode, and a dielectric spacer forming a flow path positioned between the first ion specific layer and the second ion specific layer. The dielectric spacer is configured to receive a portion of the aqueous stream from an inlet and deliver a portion of the treated aqueous stream to an outlet. Prior to winding and as wound, the first capacitor and the second capacitor are disposed upon each other such that the first electrode of the first capacitor is in electrical contact with the first electrode of the second capacitor Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Overview

Figure 1A:
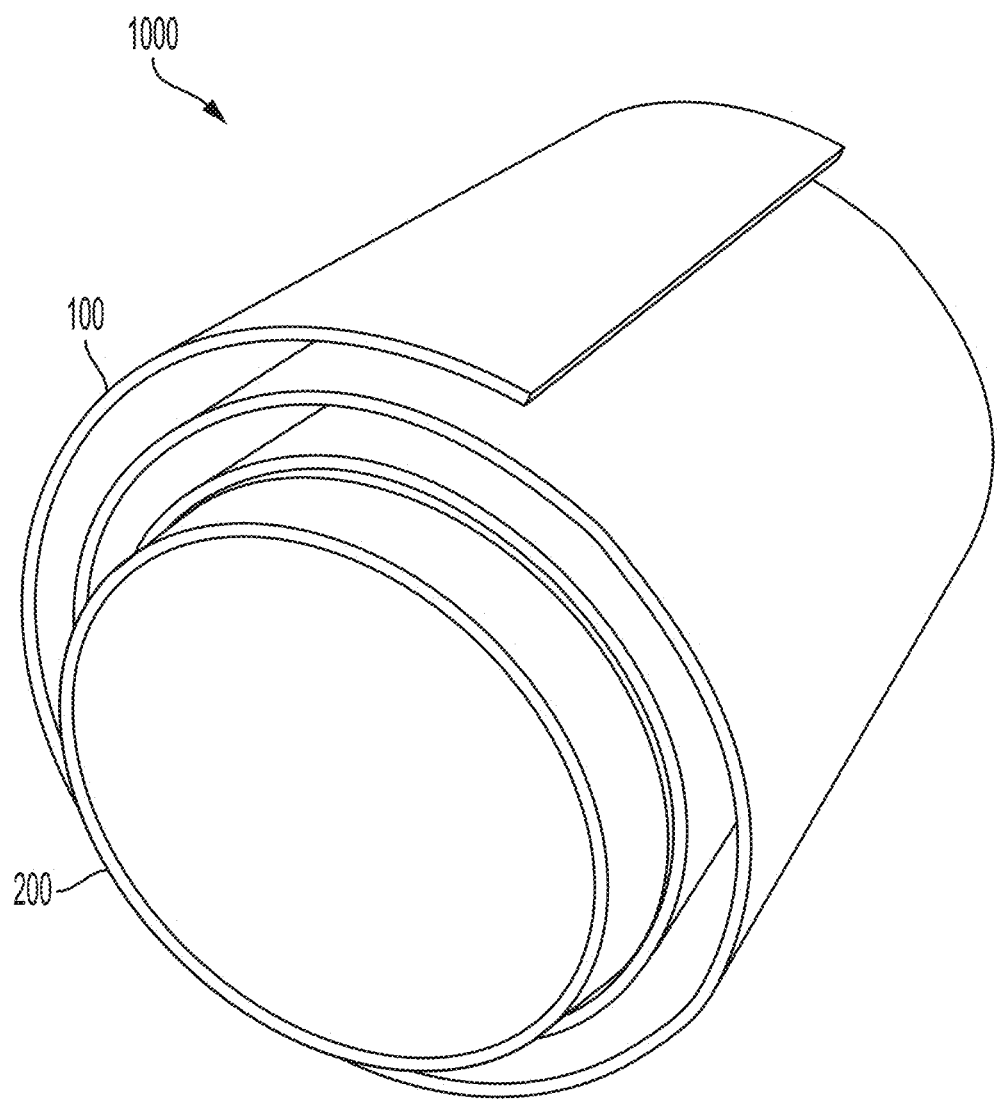
FIG. 1A is a schematic depiction of a spirally wound electric double layer capacitor device, according to some embodiments.

Articles and methods related to spirally wound electric double layer capacitor devices are disclosed. Electric double layer capacitor devices are also known as capacitive deionization (CDI) devices, so that currently disclosed devices are also referred to as spiral CDI devices herein are generally provided. The currently disclosed spiral CDI devices in certain embodiments share certain shape and conformational similarities as certain radial deionization (RDI) devices, described in commonly owned U.S. Pat. No. 9,193,612, which is incorporated herein by reference in its entirety. But, whereas the devices in U.S. Pat. No. 9,193,612 include separate, concentrically arranged electric double layer capacitors and associated electrodes, in the devices of the current design, one or more electric double layer capacitors are not concentric but rather are spirally wound and arranged about a central axis. As described in more detail below, the current spiral design may provide certain construction, performance, efficiency, cost, etc. advantages over comparable RDI and other prior art devices.

A spiral capacitive deionization device comprises one or more pairs of spirally arranged opposed electrodes forming one or more capacitors, and a dielectric spacer that forms a flow path interposed between the electrodes of the capacitor pair(s). Spiral capacitive deionization devices may be understood to be a form of capacitive deionization devices, albeit in certain embodiments with advantages over traditional plate and frame capacitive deionization devices. Spiral capacitive deionization devices of certain embodiments may include charge barriers, such as semi-permeable membranes, that prevent discharged ions from re-adsorbing onto the opposing capacitor electrodes when the cylinder is switched to a reject cycle and the capacitors' polarities are reversed. Aspects of capacitive deionization units useful or adaptable for use in certain embodiments described herein are discussed in the above mentioned U.S. Pat. Nos. 9,193,612, and 9,633,798, entitled "Atomic Capacitor," which is incorporated by reference herein in its entirety.

The electric double layer capacitor devices herein may be employed to remove ions from aqueous streams. These devices typically comprise electrodes that may be charged, and typically operate by attracting ions in the aqueous stream out of the aqueous stream and onto the charged electrodes. For example, each of the one or more capacitors may comprise at least the following: a first electrode; a first ion specific layer (also referred to as a membrane) associated with the first electrode; a second electrode spaced apart from the first electrode; a second ion specific layer (also referred to as a membrane) associated with the second electrode; and a dielectric spacer forming the flow path positioned between the first ion specific layer and the second ion specific layer and configured to receive a portion of the aqueous stream from the inlet and deliver a portion of the treated aqueous stream to the outlet. An aqueous stream comprising ions to be removed may be fed into the electric double layer capacitor device (e.g., by an inlet), may pass between the charged electrodes, and then may flow out of the electric double layer capacitor device (e.g., by an outlet). Ions may be removed from the aqueous stream as it passes between the electrodes, and the treated aqueous stream output stream from the electric double layer capacitor device may comprise fewer ions than the aqueous stream fed into the electric double layer capacitor device.

Electric double layer capacitor devices may be configured to remove ions from aqueous streams. In some embodiments, an electric double layer capacitor device may be operated by alternating steps in which ions are removed from an aqueous stream with steps in which ions accumulated within the electric double layer capacitor device are removed from the electric double layer capacitor device. During the former steps, one or more capacitors are charged at a first polarity and an aqueous stream is flowed between the electrodes therein (e.g., through a dielectric spacer positioned therebetween). Cations and anions in the aqueous stream are attracted by and move toward electrode(s) having an opposite charge to the ions (i.e. cations migrate towards the negatively charged electrode(s) and anions migrate towards the positively charged electrode(s) which is in certain embodiments made of carbon, and/or other ion capture layer(s) in proximity to the electrode.), and are thereby removed from the aqueous streams (by, e.g., being adsorbed onto the electrodes). After a period of time, the electric double layer capacitor device may become partially or fully saturated with ions. When this occurs, the polarity of the double layer capacitor(s) is/are reversed, and the ions are rejected from the surface of the respective electrodes to which they are adsorbed and into a reject water stream for disposal or collection, etc.

In some embodiments, an electric double layer capacitor device comprises one or more capacitors forming a cylindrical spiral. Some electric double layer capacitor devices described herein may be capable of removing ions at a relatively high efficiency from relatively large volumes of water and/or may be capable of removing ions at a relatively high efficiency from water flowing therethrough at a relatively high rate.

Some electric double layer capacitor devices described herein have an arrangement of capacitors therein that is particularly advantageous. For instance, capacitors (and electrodes therein) that form spirals may be beneficial. Because electrodes are electrically connected throughout their volumes, the number of electrical connections that must be made to electrodes in electric double layer capacitor devices scales with the number of electrodes in the electric double layer capacitor devices. Electric double layer capacitor devices comprising fewer electrodes that cover larger amounts of area, such as electrodes that form spirals, may require fewer electrical connections to be made to electrodes therein than electric double layer capacitor devices comprising more electrodes that cover smaller amounts of area.

Another benefit that may be associated with capacitors arranged in spirals in comparison to capacitors arranged in other designs (e.g., concentric designs, linear designs) is the lack of a need to join different parts of electrodes together, e.g. for common electrical communication with a power supply. Locations at which electrodes are joined together may be thicker than other parts of the electrodes, which may increase the pressure drop across the electric double layer capacitor device, reduce flux through the electric double layer capacitor device, and/or reduce flow uniformity through the electric double layer capacitor device. Reduced flux within the electric double layer capacitor device (i.e., reduced ion removal rate from aqueous streams flowing through the electric double layer capacitor device) and reduced flow uniformity through the electric double layer capacitor device may decrease the efficiency of the device. Locations at which electrodes are joined may also increase the variability of the electrical resistance of the electrodes across the electric double layer capacitor device. Lack of uniformity in the electrical resistance of the electrodes may result in certain portions of the electrodes operating at an electrical resistance that is outside a safe operating rage, and/or outside a range at which aging is minimized, even if the device as a whole operates within the safe range and/or range at which aging is minimized. Electric double layer capacitor device with less uniform electrical resistance may have shorter lifetimes, and/or may be less safe than electric double layer capacitor device with more uniform electrical resistance.

As another example of an advantageous arrangement of capacitors, an electric double layer capacitor device may comprise at least two capacitors (e.g., a first capacitor and a second capacitor), and the capacitors may be positioned with respect to each other in a manner that reduces the probability of electrical short formation between electrodes of opposite polarity in the capacitors. The capacitors may be positioned such that the first electrode of the first capacitor (e.g., an electrode with a first polarity) is in electrical contact with the first electrode of the second capacitor (e.g., also an electrode with the first polarity). When the capacitors are arranged in this manner, the second electrode of the first capacitor may be in direct contact or may be indirect contact (e.g., separated only by an electrically conducting intervening layer(s) such as certain ion selective membrane layers, if present) with the second electrode of the second capacitor. Because electrodes of opposite polarity are separated from each other by a dielectric spacer (as described further herein), the electric double layer capacitor device exhibits a reduced tendency to form shorts.

Advantageously, electric double layer capacitor devices with this design may be easily fabricated by placing the first capacitor on the second capacitor such that the first electrode of the first capacitor is adjacent to the first electrode of the second capacitor (or the second electrode of the first capacitor is adjacent to the second electrode of the second capacitor), and winding the two capacitors together to form the cylindrical spiral capacitor device. This method of forming electric double layer capacitor devices may be economical, and/or may result in less wasted materials than other methods of forming electric double layer capacitor devices. Other strategies for reducing probability of electrical short formation when only a single capacitor later is wound into a spiral may require additional layers (e.g., additional electrically insulating spacer layers between each winding layer), or more complicated fabrication procedures. Some fabrication methods described herein may be capable of being performed over time scales on the order of minutes, and/or at efficiencies of 16 times those of other fabrication methods (e.g., methods in which capacitors are positioned sequentially circumferentially around a central axis).

Another arrangement of capacitors that may be particularly advantageous is in the form of a spiral that is wound around a mandrel, which in certain embodiments is a hollow tube with a lumen. This arrangement may allow for the positioning or storage of certain components of the electrical double layer capacitor device within the lumen of mandrel. These components may be closer to the other components of the electric double layer capacitor device than they would be if positioned external to the device, reducing the need for lengthy connectors. Additionally, positioning certain components within the mandrel may reduce the overall size of the device compared to a device of similar capacity but with peripheral components positioned external to the device. For electric double layer capacitor devices comprising water-impermeable mandrels, it may be possible to store water-sensitive components inside the mandrel. For instance, certain water-impermeable mandrels may enclose electrical connections and/or electronics, such as electronics employed to charge electrodes within the electric double layer capacitor device.

The presence of a water-impermeable mandrel around which one or more electrodes are spirally wound may also promote flow of aqueous streams through the electric double layer capacitor device in a manner that is beneficial. The water-impermeable mandrel may act as a barrier that serves to promote axial flow through the device, and/or that serves to reduce or prevent radial or circumferential flow through the device.

In some embodiments, a water-impermeable mandrel may facilitate the formation of spiral electric double layer capacitor devices that are held under compression. The mandrel may advantageously be held while other layers are compressed against it during fabrication of the electric double layer capacitor device.

In some embodiments, one or more design features of the spiral electric double layer capacitor device are selected to provide one or more advantageous performance and/or cost benefits. As an example, the capacitor may comprise a dielectric spacer positioned between the electrodes therein having a thickness that is desirable. The dielectric spacer may form a flow path for an aqueous stream flowing through the electric double layer capacitor device, and so its thickness affects the pressure drop across the electric double layer capacitor device and/or the flux. Dielectric spacers that are relatively thick, such as those with a thickness of greater than or equal to 100 microns (e.g., greater than or equal to 125 microns, or between 100 microns and 500 microns), may result in a reduced pressure drop across the device and/or an enhanced flux. These features may, respectively, reduce the power required to operate the device and enhance the rate at which the device can treat aqueous streams.

In some embodiments, an electric double layer capacitor device comprises one or more components that are arranged in a manner that promotes flow of aqueous streams through the device in a desirable manner. For instance, the spiral electric double layer capacitor device may be cylindrical in shape and comprise an inlet, an outlet, and/or capacitors that are configured such that aqueous streams flow axially (i.e. substantially parallel to the central axis of the cylinder) through the device. Without wishing to be bound by any particular theory, it is believed that flowing aqueous streams through spiral electric double layer capacitor devices axially is more advantageous than flowing aqueous streams through spiral electric double layer capacitor devices in other manners (e.g., circumferentially). It is believed that axial flow paths through spiral electric double layer capacitor devices are typically shorter and so result in in a reduced pressure drop across the device and/or an enhanced flux.

In some embodiments, a spiral electric double layer capacitor device comprises an inlet and/or an outlet that are positioned with respect to one or more portions of the device in a manner that promotes axial flow of aqueous streams through the electric double layer capacitor device. One example of an arrangement of the inlet and the outlet that promotes axial flow of an aqueous stream is an arrangement in which they are positioned on opposed faces of the device. The opposed faces may be opposed planar or annular faces capping the ends of the cylindrical spirally wound device (see FIGS. below). For instance, an electric double layer capacitor device may comprise a cylindrical housing (e.g., enclosing a cylindrical spiral formed by one or more capacitors) sealed at each end by opposed annular or circular caps or plates. The inlet may be on one of the annular or circular caps or plates, and the outlet may be on the other. When the electric double layer capacitor device has this design, aqueous streams may enter through the inlet, flow axially through the electric double layer capacitor device to the outlet, and then out of the device from the outlet. Because the outlet is separated from the inlet by a flow path that runs axially through the electric double layer capacitor device, the aqueous stream may be caused to flow axially through the electric double layer capacitor device.

FIGURES

Figure 1B:
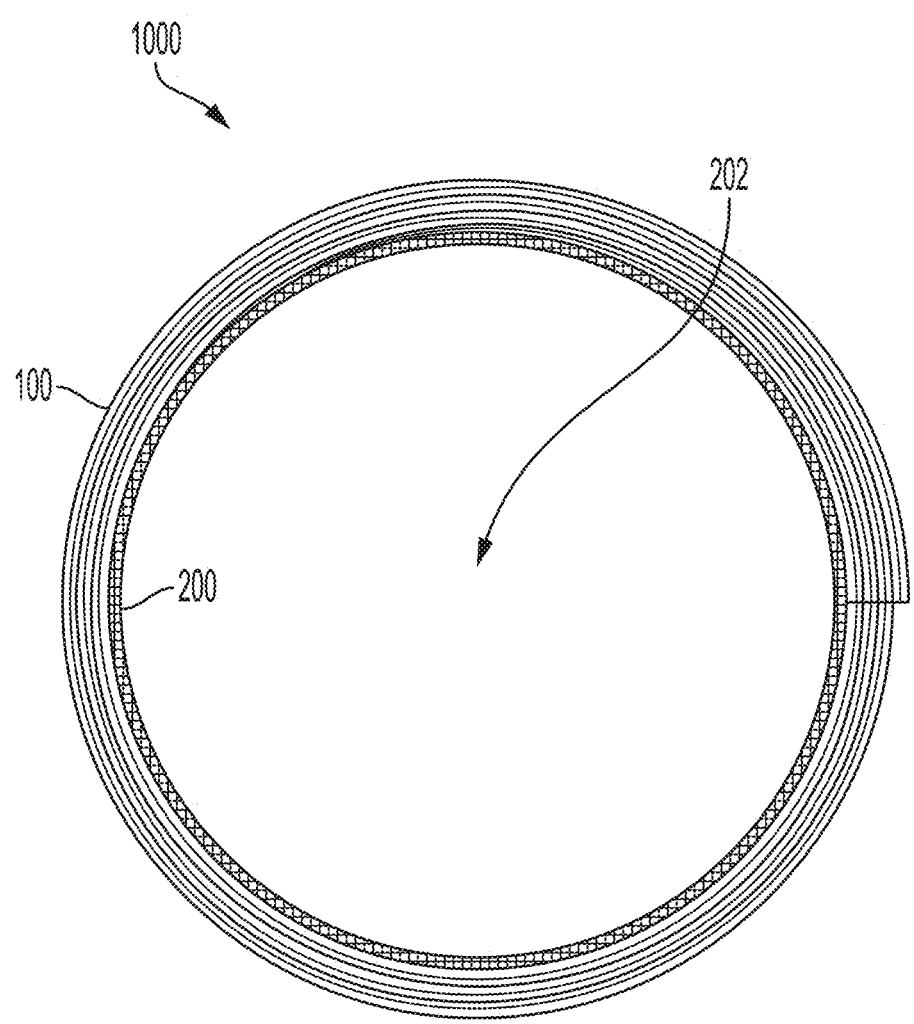
FIG. 1B is a cross-sectional view of the spirally wound electric double layer capacitor device shown in FIG. 1A, according to some embodiments.

As described herein, some embodiments relate to electric double layer capacitor devices comprising one or more capacitors forming a cylindrical spiral. FIGS. 1A and 1B show two views of one non-limiting embodiment of an uncompleted electric double layer capacitor device comprising a capacitor forming a cylindrical spiral (in the process of winding and not tightly/fully wound so as to permit easier visualization of the spiral layer structure). In FIGS. 1A and 1B, an electric double layer capacitor device 1000 comprises a capacitor 100 forming a cylindrical spiral having a centrally disposed axis about which the capacitor is wound. The electric double layer capacitor device shown in FIGS. 1A and 1B also comprises a water-impermeable mandrel 200 positioned in its geometric center 202. As used herein, the geometric center of an electric double layer capacitor device is the centroid of the electric double layer capacitor device, which is the position within the electric double layer capacitor device is the mean position of all of the points forming the outer boundary of the electric double layer capacitor device. In some embodiments, an electric double layer capacitor device comprises a water-impermeable mandrel positioned in the geometric center of a cylindrical spiral formed by one or more capacitors. In some embodiments, an electric double layer capacitor device may comprise a cylindrical spiral having substantially the same shape as a water-impermeable mandrel about which it is positioned. For instance, the water-impermeable mandrel may have a cylindrical shape, and one or more capacitors may form a cylindrical spiral about the cylindrical water-impermeable mandrel. In alternative embodiments, the mandrel and/or spiral cylinder formed from the wound capacitors are not circular in circumferential shape as illustrated but may be other shapes and/or the axis about which the spiral is formed may not be centrally disposed in the resulting spiral device.

For example, it should be understood that some electric double layer capacitors may differ from the electric double layer capacitor device shown in FIGS. 1A and 1B. For instance, an electric double layer capacitor device may lack a water-impermeable mandrel, may include a water-impermeable mandrel with a different shape (e.g., non-cylindrical) and/or positioned in a different location (e.g., a location other than the center of the electric double layer capacitor device), may include more than one spirally wound capacitor, and/or will typically include one or more features not shown in FIGS. 1A and 1B (e.g., an inlet, an outlet, one or more components such as electrical connections contained within the water-impermeable mandrel). As an example, the water-impermeable mandrel may be tubular and may comprise a lumen. The lumen may enclose one or more components of the electric double layer capacitor device not shown in FIGS. 1A and 1B, such as one or more electrical components (e.g., an electrical connection).

Figure 1C:
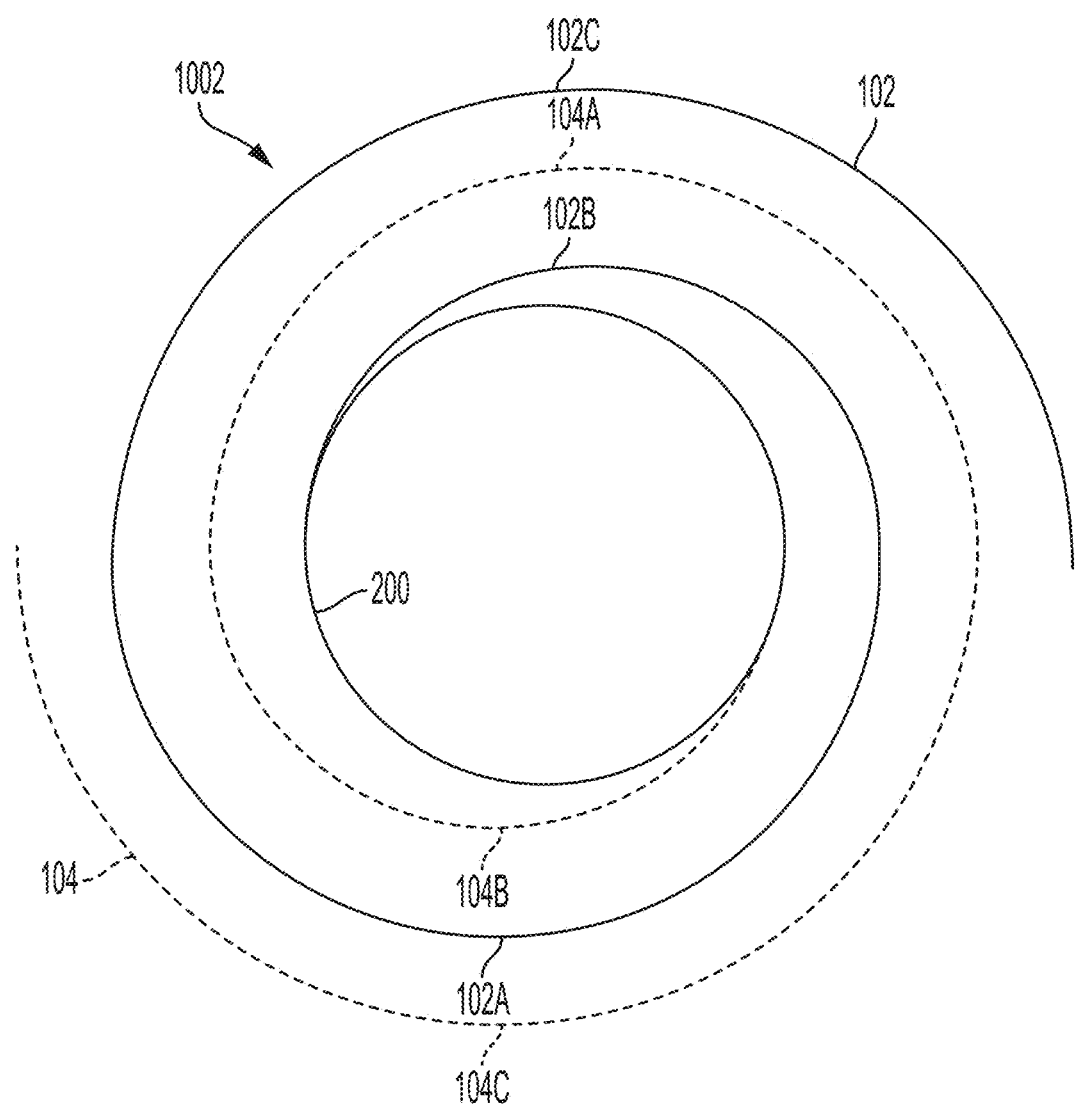
FIG. 1C is a cross-sectional view of an electric double layer capacitor device comprising two capacitors together forming a cylindrical spiral having a centrally disposed axis about which the two capacitors are wound, according to some embodiments.

In some embodiments, an electric double layer capacitor device comprises two or more capacitors. The electric double layer capacitor device may comprise a first capacitor and a second capacitor, and both the first and second capacitors may each form a cylindrical spiral having a centrally disposed axis about which it is wound. In some embodiments, the central axis about which the first capacitor is wound is the same as the central axis about which the second capacitor is wound. In other words, the two or more capacitors may together form a cylindrical spiral having a centrally disposed axis about which the two or more capacitors are wound. FIG. 1C shows one non-limiting embodiment of an axially-projected cross-sectional view of an electric double layer capacitor device with this structure. In FIG. 1C, an electric double layer capacitor device 1002 comprises a first capacitor 102 and a second capacitor 104, which form a cylindrical spiral having a centrally disposed axis about which the two capacitors are wound. As shown in FIG. 1C, the first and second capacitors may form a spiral around the water-impermeable mandrel (water impermeable mandrel 200 in FIG. 1C). Other arrangements of electric double layer capacitor devices comprising two or more capacitors are also possible (e.g., as above, the water-impermeable mandrel may have a different design or may be absent; the capacitors may have a different design or spacing from each other; the electric double layer capacitor device may comprise further capacitors).

Figure 2:
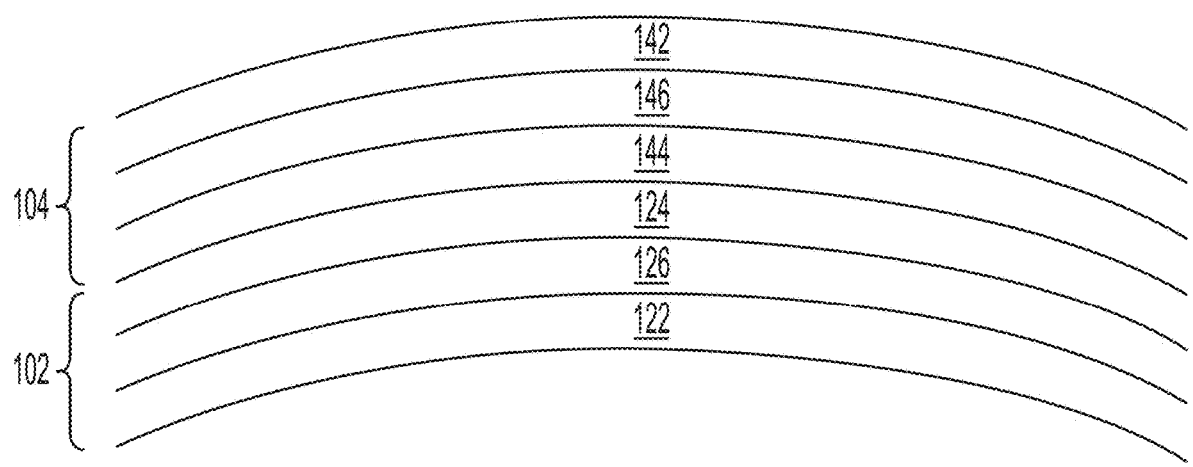
FIG. 2 is a cross-sectional view of a portion of an electric double layer capacitor device comprising two capacitors arranged such that electrodes of like polarity are in electrical contact with each other.

In some embodiments, an electric double layer capacitor device comprises two or more capacitors, and the two or more capacitors are positioned with respect to each other in a desirable manner. For example, as described above and shown in FIG. 2, an electric double layer capacitor device may comprise two capacitors arranged such that electrodes of like polarity are in electrical contact with each other, either directly or via an intermediate electrically conductive layer(s). In FIG. 2, which shows a cross-sectional schematic depiction of a portion of an electric double layer capacitor device, a first capacitor 102 is directly adjacent to a second capacitor 104. The first capacitor 102 comprises a first electrode 122, a second electrode 124, and a dielectric spacer 126. The first capacitor may also comprise a first ion specific layer positioned between the first electrode and the dielectric spacer, and/or a second ion specific layer positioned between the second electrode and the dielectric spacer (not shown). The second capacitor 104 comprises a first electrode 142, a second electrode 144, and a dielectric spacer 146. The second capacitor may also comprise a first ion specific layer positioned between the first electrode and the dielectric spacer, and/or a second ion specific layer positioned between the second electrode and the dielectric spacer (not shown). In FIG. 2, the second electrode of the first capacitor is in electrical contact with the first electrode of the second capacitor.

It should be noted that FIG. 2 only shows a portion of the electric double layer capacitor device. In some double electrical capacitor devices comprising two capacitors described herein, the two capacitors both wrap around the centrally disposed axis multiple times to form a cylindrical spiral. For such devices, portions of the second capacitor may be positioned between portions of the first capacitor and portions of the first capacitor may be positioned between portions of the second capacitor when viewed in cross-section. By way of example, with reference to FIG. 1C, a portion 102A of the first capacitor 102 is positioned between portions 104B and 104C of the second capacitor 104. As also shown in FIG. 1C, a portion 104A of the second capacitor 104 is positioned between portions 102B and 102C of the first capacitor 102. With reference to FIG. 2, devices in which portions of the second capacitor are positioned between portions of the first capacitor and portions of the first capacitor are positioned between portions of the second capacitor would include more layers than those shown in FIG. 2. The additional layers may include, for instance, another portion of the first electrode 122 of the first capacitor 102 in electrical contact with the first electrode 142 of the second capacitor 104.

As described herein, in some embodiments, a functioning spiral electric double layer capacitor device comprises further components other than the capacitor(s) and/or water-impermeable mandrel shown in FIGS. 1A-1C and FIG. 2. For instance, the electric double layer capacitor device may further comprise a fluid inlet and/or an outlet, electrical connections and components, and/or a housing. The housing may enclose one or more portions of the electric double layer capacitor device (e.g., one or more capacitors, electronic components, etc.). In some embodiments, the housing may have an advantageous shape. For instance, the housing may have a shape that is substantially the same as the shape of the portion(s) of the device it contains. In some embodiments, the housing may be a cylindrical housing enclosing a volume bounded by a cylindrical surface and two opposed annular or circular plates or caps on opposite ends of the cylindrical surface.

Figure 3A:
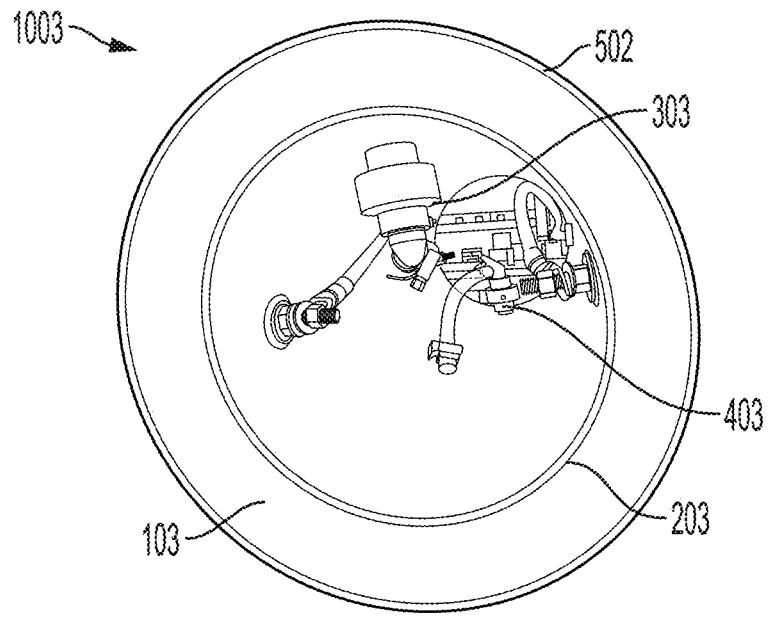
FIGS. 3A and 3B are illustrations of electric double-layer capacitor devices, according to some embodiments.
Figure 3B:
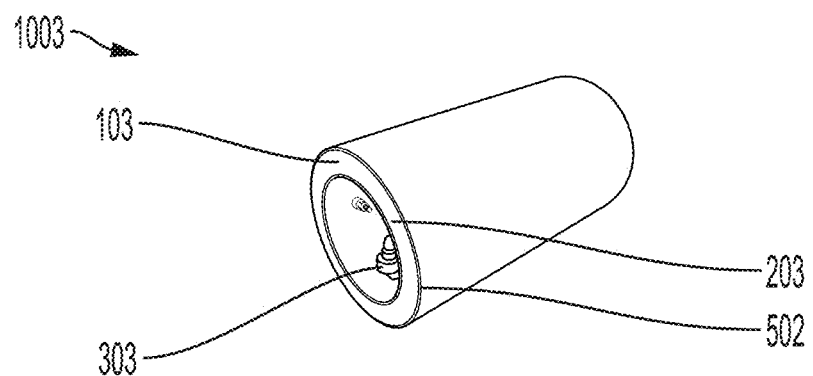

FIGS. 3A and 3B show differing view of one non-limiting embodiment of an electric double layer capacitor device comprising a cylindrical housing enclosing a volume bounded by an outer cylindrical surface, an inlet positioned to receive the aqueous stream from a source and direct it into the volume, and an outlet for delivering a treated aqueous stream out of the volume to a destination. In FIGS. 3A and 3B, electric double layer capacitor device 1003 comprises a cylindrical housing comprising a cylindrical surface 502, an inner water-impermeable tubular mandrel 203 defining a lumen, an inlet 303, an outlet 403 (not shown in FIG. 3B), and one or more capacitors 103. In FIGS. 3A and 3B, the volume enclosed by the cylindrical housing is also bounded by the water-impermeable inner tubular mandrel that is tubular and defines a central lumen. This volume may contain one or more components of the electric double layer capacitor device, such as capacitors, electrodes, dielectric spacers, and/or electronic components. In FIGS. 3A-3B, the inlet and the outlet are positioned within the lumen and penetrate the water-impermeable inner tubular mandrel. Without wishing to be bound by any particular theory, it is believed that positioning inlets and/or outlets interior to an electric double layer capacitor device (e.g., interior to a lumen defined by water-impermeable inner tubular mandrel) may advantageously reduce the overall size of the electric double layer capacitor device.

Inlets described herein may be configured to receive an aqueous stream (e.g., an aqueous stream to be treated within the electric double layer capacitor device) from a source and to direct an aqueous stream into the electric double layer capacitor device (e.g., into a volume enclosed by a cylindrical housing). Outlets described herein may be configured to deliver a treated aqueous stream (e.g., an aqueous stream treated within the electric double layer capacitor device) to a destination. The aqueous stream may be delivered out of a volume enclosed by a cylindrical housing. The inlet and/or the outlet may be in fluidic communication with one or more other portions of the dielectric double layer capacitor device, such as one or more portions configured to treat an aqueous stream (e.g., a flow path, a dielectric spacer). As described further elsewhere herein, aqueous streams may flow into the electric double layer capacitor device into the inlet, through the inlet, through dielectric spacers in fluid communication with the inlet (where they are treated to form treated aqueous streams), through the outlet, and out of the electric double layer capacitor device. In some embodiments, one or more end caps may be positioned on the external surfaces of the housing. The end caps may comprise a water-impermeable material. In some embodiments, the end caps is comprise a foam.

In some embodiments, an electric double layer capacitor device is configured to cause aqueous streams to flow therethrough along a flow path. In other words, the electric double layer capacitor device may be configured to cause aqueous streams to flow therethrough in particular directions and/or to cause aqueous streams to flow through certain portions of the electric double layer capacitor device in certain sequences. The flow path may pass from an inlet to an outlet, and/or may pass through one or more capacitors (e.g., between two electrodes of opposite polarity, through a fluid porous dielectric spacer positioned between two electrodes of opposite polarity). The flow path may be one for which the flow through the electric double layer capacitor device is substantially uniform. In other words, the flow path may be one for which the flow does not vary greatly across the cross-section of the flow path (e.g., it may vary in magnitude by less than or equal to 20%, 10%, 5%, 2%, or 1%; the maximum angle between flow at any two components may be less than or equal to 10°, 5°, 2°, 1°, or) 0.5°.

In some embodiments, an electric double layer capacitor device is configured to cause aqueous streams to flow therethrough along a flow path that is axially oriented. One or more components of the electric double layer capacitor device, and/or the electric double layer capacitor device as a whole, may cause aqueous streams to flow through the electric double layer capacitor device in an axial manner. For instance, in some embodiments, the inlet, outlet, and capacitor(s) are configured to cause the aqueous stream to flow through the electric double layer capacitor device in an axial direction. The axial direction may be parallel to a central axis about which one or more capacitors are wound (e.g., when the central axis about which the one or more capacitors are wound is parallel to the central axis of the electric double layer capacitor device).

In some embodiments, a flow path for an aqueous stream through an electric double layer capacitor device is not perfectly axial. For instance, the flow path for the aqueous stream may be substantially axial. In other words, the electric double layer capacitor may be configured such that the aqueous stream flows substantially axially through the device. Flow that is substantially axial indicates flow in which the majority of the bulk flow direction is axial, but which may also include some flow that is not axial, particularly in localized regions (e.g., flow that is radial, flow that is circumferential, etc.). The flow that is not axial may make up a relatively small percentage of the total flow (e.g., less than 10%, less than 5%), or zero percentage of the total bulk flow. In some embodiments, the flow path for the aqueous stream may be configured such that there is minimal flow through the electric double layer capacitor device in directions perpendicular to the axial direction (e.g., in a radial direction, in a circumferential direction), and/or such that there is essentially no flow of the aqueous stream through the device in a direction perpendicular to an axial direction. In the latter case, the net flow along the flow path from the inlet of the electric double layer capacitor device to the outlet of the electric double layer capacitor device may not include any component in a direction perpendicular to an axial direction, or may include a component in a direction perpendicular to an axial direction that is very minimal (e.g., makes up less than 2%, less than 1% of the total flow).

Figure 4A:
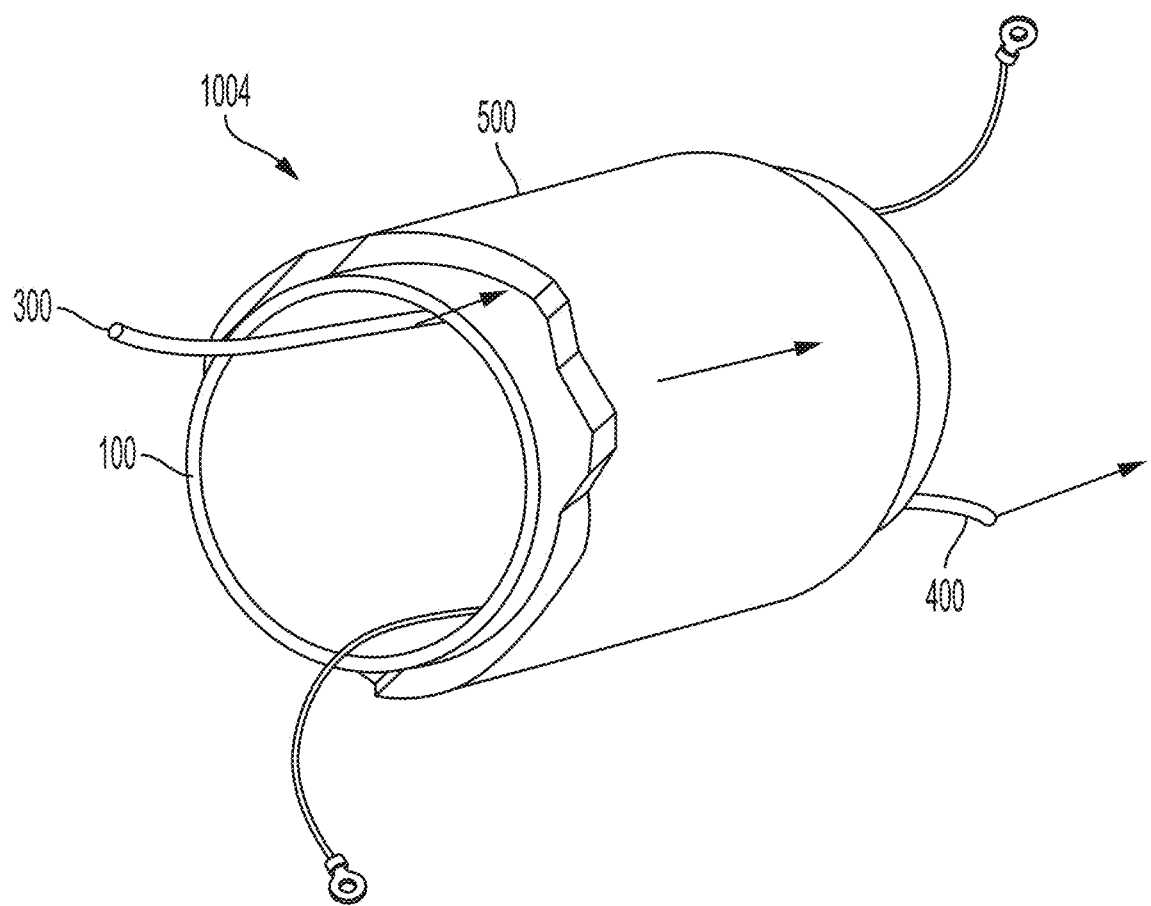
FIG. 4A is a partially cut-away view of one non-limiting example of a spiral electric double layer capacitor device configured to cause aqueous streams to flow therethrough in an axial direction, according to some embodiments.

FIG. 4A shows a partially cut-away view of one non-limiting example of a spiral electric double layer capacitor device configured to cause aqueous streams to flow therethrough in an axial direction. For clarity of illustration, the device of FIG. 4A (as well as the FIG. 4B below, illustrates an embodiment with only a single winding layer illustrated. FIG. 4C illustrates an optional configuration for a two-winding layer embodiment. It should be understood that this is non-limiting and the in typical embodiments, actual devices will have multiple winding layers. In FIG. 4A, electric double layer capacitor device 1004 comprises a water-impermeable mandrel 204, an inlet 300, an outlet 400, and a housing 500. As shown by the arrows in FIG. 4A, the electric double layer capacitor device 1004 is configured to cause an aqueous stream to flow into the inlet, in an axial direction from the inlet, around the water-impermeable mandrel to the outlet, and out through the outlet. In some embodiments, like that shown in FIG. 4A, aqueous streams flow through the electric double layer capacitor device along a flow path with an annular-shaped cross-section. In other embodiments, the aqueous streams flow through the electric double layer capacitor device along a flow path with a different cross-section.

Figure 4B:
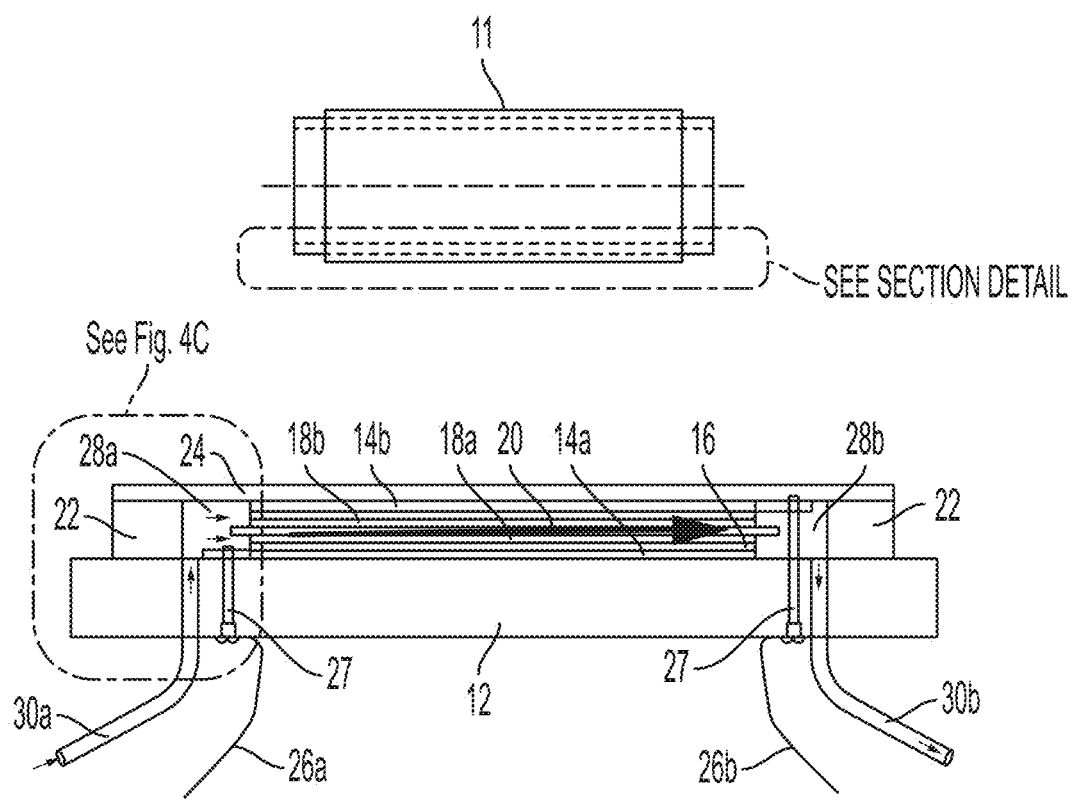
FIG. 4B is another view of the non-limiting example of the electric double layer capacitor device of FIG. 4A, according to some embodiments.
Figure 4C:
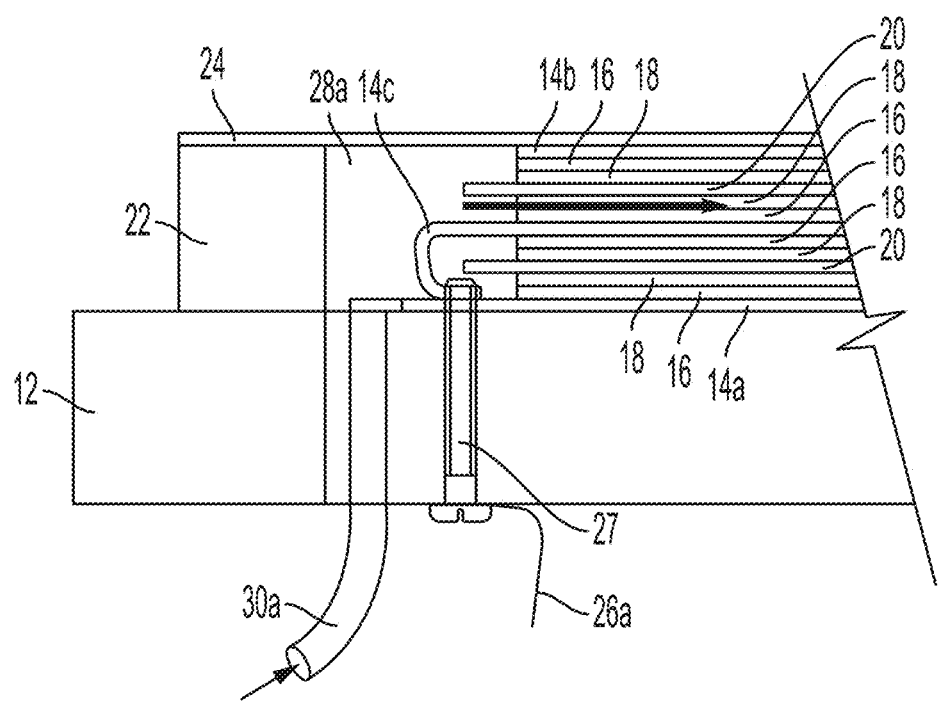
FIG. 4C is a cross-sectional view of a portion of a spiral electric double layer capacitor device configured to cause aqueous streams to flow therethrough in an axial direction, according to some embodiments.

FIG. 4B shows another view of the non-limiting example of the electric double layer capacitor device of FIG. 4A configured to cause aqueous streams to flow therethrough in an axial direction. As described in further detail below, the arrows in FIG. 4B show the direction that the electric double layer capacitor device is configured to cause the aqueous streams to flow. In FIG. 4B, an electric double layer capacitor device 11 comprises a water-impermeable mandrel 12, and a capacitor forming a cylindrical spiral around the water-impermeable mandrel. The capacitor includes a number of layers, including layers with reference signs 14a, 14b, 16, 18a, 18b, and 20. As described in more detail above and below herein, these may include current collectors, electrodes, ion specific layers, dielectric spacers, and other capacitor components.

In the design shown in FIG. 4B, an inner most capacitor electrode 16 is wrapped around a current collector 14a, which could be a graphite rod, a hollow metallic tube or a metallic coating on the mandrel 12, sleeve, or other thin current collector 14a. Around this inner capacitor electrode 16 could be an ionic membrane 18a or an ionic coating integrated onto a surface of capacitor electrode 16. Next, a dielectric spacer, insulator, or spacer 20 would surround a capacitor electrode 16 or membrane 18 which would allow for a liquid layer to flow through the capacitor layers of cylinder 11. Around this layer would be another ion selective membrane 18b, another capacitor electrode 16, and then another current collector 14b.

FIG. 4B also shows several other components that may be each independently be optionally included in electric double layer capacitor devices described herein, such as: a housing 24; end spacers/caps 22 (which in some embodiments may be an O-ring) configured to seal the interior of the electric double layer capacitor device from an environment exterior to the electric double layer capacitor device and/or configured to compress the capacitors positioned therein against the water-impermeable mandrel and/or configured and spaced apart from the ends of the capacitor spiral to create a fluid header space 28a and 28b for fluidic connection with an inlet 30a an outlet 30b, respectively; electrical connections 26a and 26b configured to electrically connect the capacitors to an electrical controller; and/or electrical lead posts 27.

In some embodiments, one or more components of an electric double layer capacitor device herein may be water-impermeable. For instance, an electric double layer capacitor device may comprise an inlet and/or an outlet that are water-impermeable (i.e., in directions in the inlet and/or outlet are not configured to have aqueous streams flow). As another example, an electric double layer capacitor device may comprise one or more capacitors that are electrically connected to an electrical controller by water-impermeable electrical connections. As a third example, an electric double layer capacitor device may comprise a housing 24 that is water-tight. As a fourth example, and as described elsewhere herein, an electric double layer capacitor device may comprise a water-impermeable mandrel 12.

The arrow in FIG. 4B show the path along which aqueous streams are configured to flow through the electric double layer capacitor device depicted therein. As illustrated in FIG. 4A, the electric double layer capacitor device as illustrated in FIG. 4B is configured to cause an aqueous stream to flow in an axial direction from the inlet, around the water-impermeable mandrel, and out through the outlet. The aqueous stream may enter the electric double layer capacitor device through the inlet 30A, flow axially through one or more capacitors, and then out through the outlet 30B.

FIG. 4C shows another view of an optional design for the device shown in FIG. 4B, in which an embodiment of an optional configuration for a two winding layer stack is illustrated. The inlet and portions of the device surrounding the inlet have been enlarged. The arrows show the flow path that the electric double layer capacitor device depicted in FIG. 4C is configured to cause aqueous streams to flow along. As also shown in FIG. 4B, this flow path includes entering the electric double layer device through an inlet 30A, and then flowing axially through the electric double layer capacitor device towards the outlet along a flow path through one or more capacitors positioned therein. The structure of the cylinder as illustrated in FIG. 4C is the same as illustrated in FIG. 4B, except that an internal current collector 14c is placed onto a capacitor electrode 16 of a first winding layer. On top of current collector 14c is placed another capacitor winding layer comprising another electrode layer 16, another membrane layer 18, another dielectric spacer layer 20, another membrane layer 18, and then another capacitor electrode layer 16. This sequence can be repeated until the desired number of spiral layers of capacitor(s) is wound onto inner mounting mandrel 12.

Operation of electric double layer capacitor devices can also be described with respect to FIGS. 4A-4C. When an electric double layer capacitor device 11 is operating as capacitive deionization device, liquid to be processed such as water enters the electric double layer capacitor device through an inlet 30a into an inlet chamber 28a. The liquid passes axially through the dielectric spacer(s) 20, into an outlet chamber 28b and then out of the electric double layer capacitor device 11 through outlet 30b. The size of chambers 28a and 28b can be adjusted by filling with a space filling material such as foam, if desired. In some embodiments, operation can proceed as follows. Electrical leads, such as leads 26a and 26b as illustrated in FIG. 4B, are connected to a direct current power supply (DC). In some embodiments, one capacitor electrode 16 is connected to one leg of a power supply and another capacitor electrode 16 connected to another leg of the power supply. The power supply is turned on and each capacitor is charged to the voltage set on the power supply. In some embodiments, the power supply would be set to 2.2 V when processing aqueous liquids.

If a capacitor electrode 16 nearest a water-impermeable mandrel 12 is charged positively, it will attract negatively charged ions (anions). If an ion specific layer 18a proximal to this capacitor electrode 16 is anionic, it will allow anions from the liquid in the dielectric spacer 20 to pass through and adsorb onto the capacitor electrode 16. This adsorption will continue until the amount of ionic charge adsorbed onto the capacitor electrode 16 equals the charge capacity of the capacitor electrode 16. Conversely, if a capacitor electrode 16 nearest a housing 24 is charged negatively, it will attract positively charged ions (cations). If an ion specific layer 18b proximal to this capacitor electrode 16 is cationic, it will allow cations to pass through until the capacitor electrode 16 is full.

Once capacitors electrodes have adsorbed the prescribed amount of ions (partial or full adsorption), the polarity of the power supply may be switched. Capacitor electrodes that were charged positively may be switched to being charged negatively and other capacitor electrodes that were charged negatively may be switched to being charged positively. The ions that were adsorbed onto each electrode may be repelled from that electrode and towards oppositely charged capacitor electrodes. When opposite ion specific layers 18 are placed in front of each capacitor electrode, the repelled ions may not be capable of passing through the ion specific layer and may be prevented from adsorbing onto oppositely charges capacitor electrode. These rejected ions may be held within the dielectric spacer 20 and can be expelled from the electric double layer capacitor device 11.

After most or all the ions have been dislodged from the capacitor electrodes 16 and discharged from the electric double layer capacitor device 11, the adsorption and rejection process can be repeated. If a 3 way valve (or multiple 2 way valves) is (are) placed on the outlet 30b, the deionized liquid can be diverted away from the liquid containing the rejected ions. The electric double layer capacitor device 11 power supply may be configured to switch the polarity of the electrodes back and forth, removing ions from solution and depositing the ions back into solution, creating a deionized portion and a portion containing the removed ions.

Some embodiments are related to methods for forming electric double layer capacitor devices, such as the electric double layer capacitor devices described herein. A method of forming an electric double layer capacitor device may comprise winding one or more capacitors to form a cylindrical spiral. In some embodiments, two or more capacitors are wound to form the cylindrical spiral. When two or more capacitors are wound to form the cylindrical spiral, at one or more points in time (e.g., prior to winding, as wound, both prior to winding and as wound) they may be disposed upon each other such that a first electrode of the first capacitor is in electrical contact with a first electrode of the second capacitor. As described herein, this procedure may allow for the formation of an electric double layer capacitor device with a reduced tendency to form shorts in a relatively simple procedure. In some embodiments, the one or more capacitors may be wound about a water-impermeable mandrel.

Figure 5:
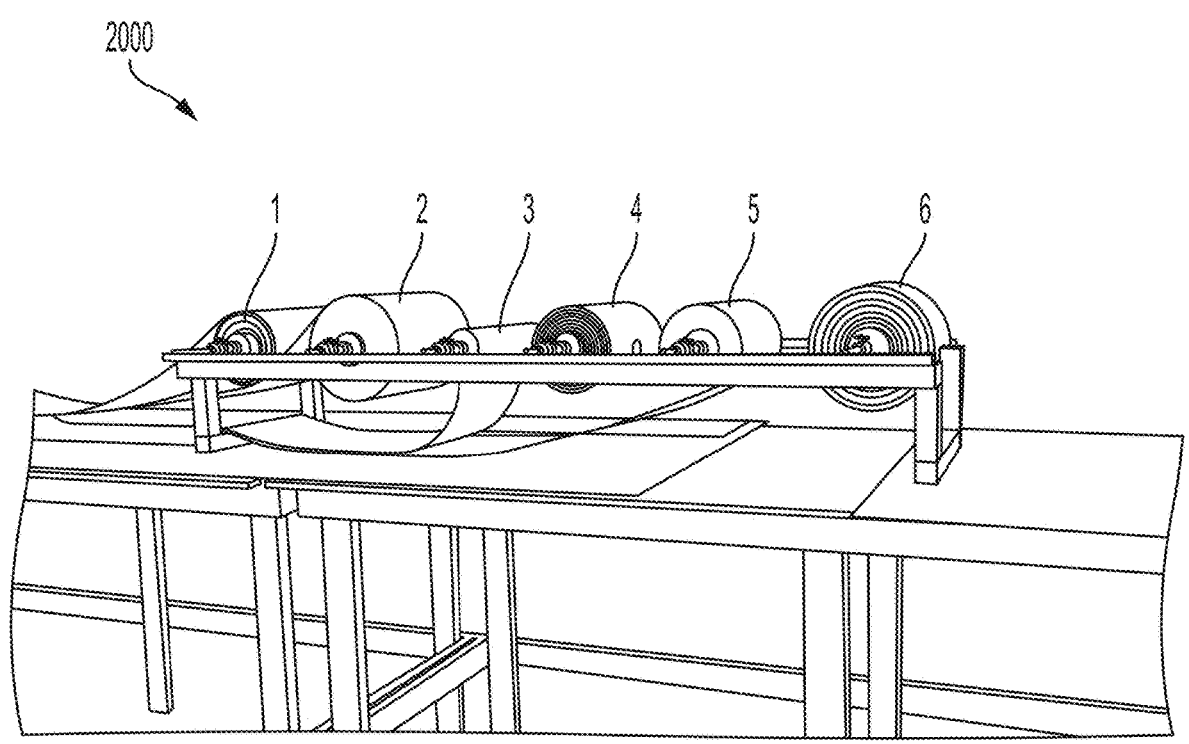
FIG. 5 is an illustration of a system that may be used to fabricate an electric double layer capacitor device, according to some embodiments.

FIG. 5 shows a system that may be used to perform a method described herein and/or to fabricate an electric double layer capacitor device described herein. In FIG. 5, system 2000 comprises a first roll 1 around which a first electrode is wrapped, a second roll 2 around which a first dielectric spacer is wrapped, a third roll 3 configured to be wrapped by a second electrode, a fourth roll 4 around which a second electrode is wrapped, a fifth roll 5 around which a second dielectric spacer is wrapped, and a sixth roll 6 around which a first electrode is wrapped. In some embodiments, two or more components may be wrapped around a single roll. For instance, in some embodiments, an ion specific layer disposed on an electrode may be wrapped around a roll (e.g., a first ion specific layer associated with a first electrode, a second ion specific layer associated with a second electrode).

A system like that shown in FIG. 5 may be employed to form an electric double layer capacitor device by performing several steps. The first step may be unwinding each roll to form a stack comprising, from bottom to top, a first electrode (and, optionally, a first ion specific layer associated with the first electrode), a dielectric spacer, a second electrode (and, optionally, a second ion specific layer associated with the second electrode), another second electrode (and, optionally, a second ion specific layer associated with the second electrode), another dielectric spacer, and another first electrode (and, optionally, a first ion specific layer associated with the first electrode). The first three layers (e.g., the first first electrode, the first dielectric spacer, and the first second electrode) may form a first capacitor and the second three layers (e.g., the second second electrode, the second dielectric spacer, and the second first electrode) may form a second capacitor. This stack may then be wound (e.g., about a water-impermeable mandrel) to form a cylindrical spiral having a centrally disposed axis around which the capacitors are wound. It should be noted that the electrodes and spacers need not be totally unwound from the rolls around which they are wrapped before they are rolled to form the cylindrical spiral. The rolls around which the electrodes and dielectric spacers are wrapped may be simultaneously unwound while previously unwound portions of the electrodes and dielectric spacers are wound together to form the cylindrical spiral.

In some embodiments, a winding tension or torque may be applied to one or more components being wound (e.g., one or more electrodes, one or more dielectric spacers) during the winding process. Applying winding tension or torque to components as they are being wound may allow for the formation of electric double layer capacitor devices comprising capacitors under compression without the need to include compression layers. The winding tension or torque may be selected create a desirable radial compression force as the first capacitor and second capacitor are wound. The devices thus manufactured not requiring additional compression layers may perform as well as similar devices comprising compression layers while including fewer layers, thus reducing cost and size. These devices may be less bulky and/or lighter weight that devices comprising compression layers.

[Manufacturing Example]

A specific, non-limiting, example of the fabrication of an embodiment is now described in the context of FIGS. 6A-6E. FIGS. 6A-6E illustrate an embodiment of a manufacturing process for forming a relatively small scale spirally wound radial capacitive deionization device. The process and dimensions may be scaled to produce other embodiments having different sizes and capacities. More information on the selection of suitable materials and dimensions are provided in the sections after the following description of an exemplary manufacturing example.

Figure 6A:
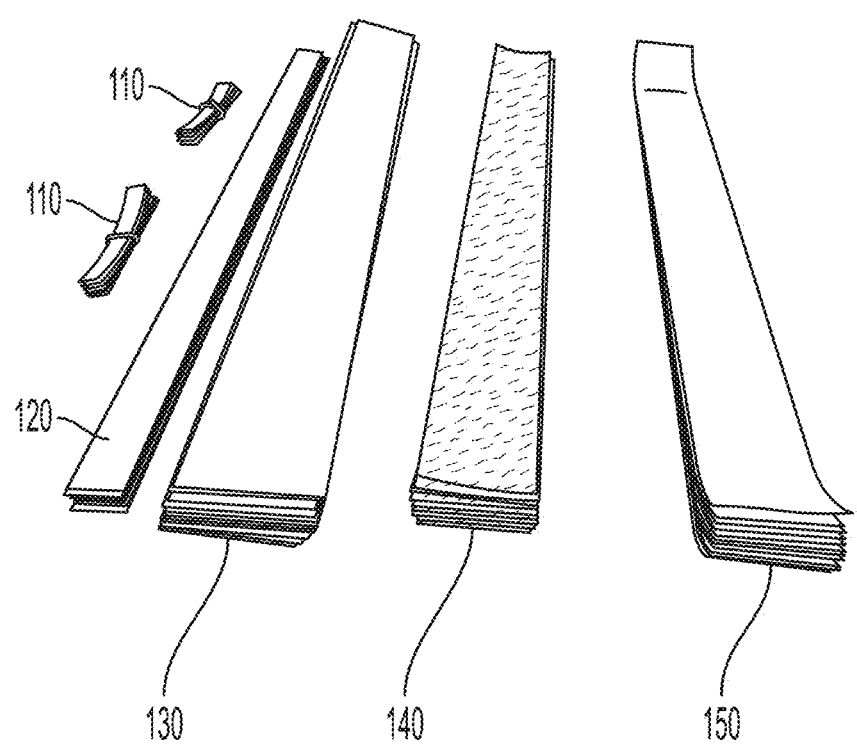
FIG. 6A is an illustration of a spirally wound electric double layer capacitor device in a pre-assembled state, according to some embodiments.

In FIG. 6A, materials for use in forming an exemplary embodiment of a spirally wound device are shown. These materials include: conductive leads 110 (e.g. formed of a conductive metal, such as titanium); current collector strips 120 (e.g. formed of a conductive metal, such as titanium); spacer material 130; combined cationic-selective membrane and electrode material 140; and combined ionic-selective membrane and electrode material 150. In an exemplary completed device, conductive leads 110 connect internal collector strips 120 to external bolts (shown in FIG. 6E). Internal current collector strips 120 serve as current collectors that run the entire length of material that is formed into the spiral, in the completed device, and reduce resistance. The spacer material 130 serves as a flow channel for water, and also functions as the dielectric of the capacitor. In the illustrated example, the current collector strips 120 may have a thickness of about 0.001 to 0.01 inches. In some embodiments, the conductive leads 110 may have a thickness of about 0.001 to 0.01 inches. In some embodiments, the spacer material 130 may be made of many woven and nonwoven insulating materials such as hemp, nylon cloth, polypropylene, or other non-conductive materials lave has a thickness of about 125 microns to 500 microns.

In some embodiments the combined membrane and electrode material 140 and 150 may have a thickness of about 250 microns to 500 microns, with of the combined material separately having a thickness of about 25 microns to 250 microns. The membrane portion may comprise commercially available ion-selective membrane material. The membrane materially may comprise a polymeric membrane that has been functionalized to be ion-selective. The membrane material may be similar or identical to membrane material commonly employed for electrodialysis applications. The electrode portion may comprise carbon material, for example, carbon black, activated carbon, pseudo capacitor materials, ionic dopants, carbon nanotubes, carbon Buckyballs, etc. In some embodiments, where a combined membrane/electrode material is formed, the electrode material may be coated onto a base membrane material. Alternatively, the membrane layer and electrode layer may be provided separately. The combined electrode/membrane material may also comprise a current collector layers. According to some embodiments the combined layers are commercially available. They may be formed by coating an electrode layer onto a current conductor layer (e.g., graphoil) and allowing the coating to cure. Then coating a membrane material onto the electrode layer and allowing it to cure. Alternatively, electrode, membrane, and current conductor layers may each be provided separately.

Different layers or materials of the device may serve one or more functions. For example, any one of the layers may also be made from a material that functions as a compressive layer or spring layer, as it resists the spiral shape it has been wound into, beneficially stabilizing the devices structure. In some embodiments a current collector layer made from a conductive material that is biased toward uncoiling (e.g., titanium) also serves as a spring layer.

Each of the components of FIG. 6A prior to assembly may have a width of about 2.5 to 25 centimeters, the approximate equivalent of the height from end to end of the resulting spirally wound capacitive deionization device, minus about an 2.5 centimeters of space at each end of the resulting device. The materials may have a sufficient length in the direction in which they will be wound of to result in a final diameter of the device of about 2.5 to 7.5 centimeters. As one example, the materials shown in FIG. 6A have a length of about 76 centimeters. When the device is electrically coupled for operating in a purification mode, the combined cationic-selective membrane and electrode material 140 is negatively charged and adsorbs positively charged (cationic) ionic species from the flow stream to produce a treated stream. When operating in a reject mode, the polarity is reversed and the combined cationic-selective membrane and electrode material 140 is positively charged, repulsing the previously adsorbed cationic species through the cationic-selective membrane material and into a brine reject stream. The combined anionic-selective and electrode material 150 operates similarly, with the charges reversed, to remove anionic material from a treated stream and return those anions to a brine reject stream. The capacitor material 140 and 150 may also comprise a coating (e.g., a graphite coating) to function as current collector.

Figure 6B:
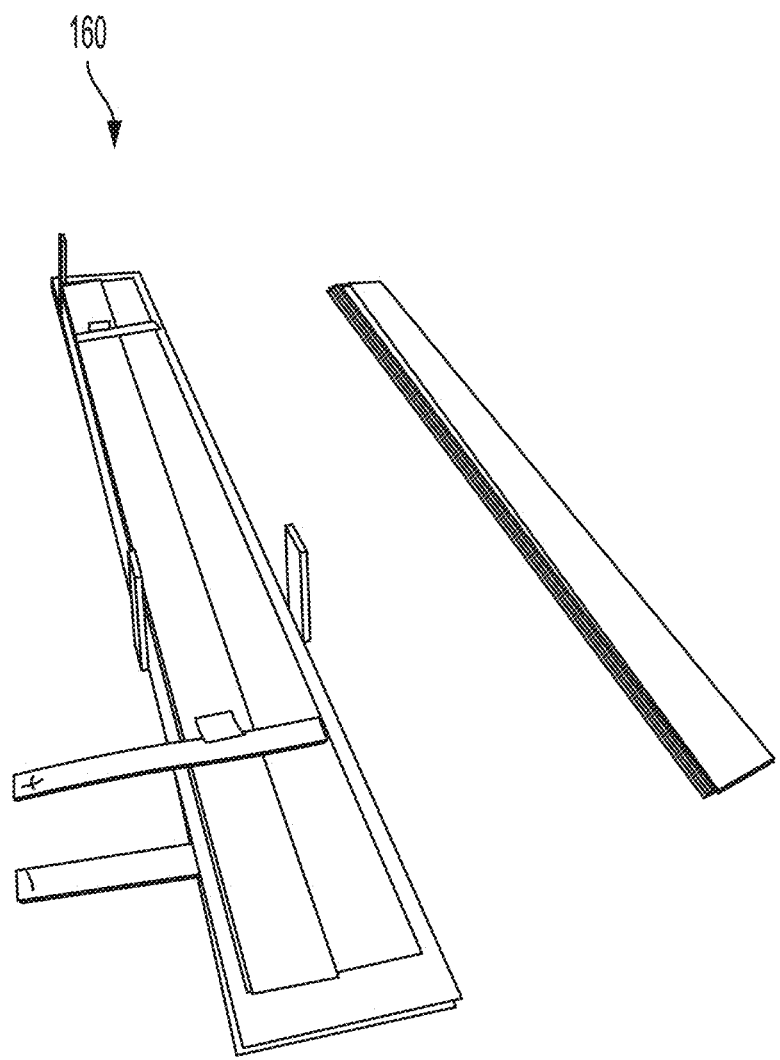
FIG. 6B is an illustration showing a layered configuration of the materials of FIG. 6A for use in constructing an electric double layer capacitor device, according to some embodiments.

In FIG. 6B, the materials described in FIG. 6A are shown mid-manufacturing process arranged in the layers that will be spirally wound. The arrangement for the stacked layer 160 in the embodiment shown is, from bottom-up, as follows: combined cationic-selective membrane and electrode material 140; spacer material 130; combined ionic-selective membrane and electrode material 150; titanium strip 120; titanium lead 110 (together functioning, in this case, as the anode of the resulting capacitor device); combined ionic-selective membrane and electrode material 150; spacer material 130; combined cationic-selective membrane and electrode material 140; titanium strip 120; and titanium lead 110 (together functioning, in this case, as the cathode of the resulting capacitor device).

Figure 6C:
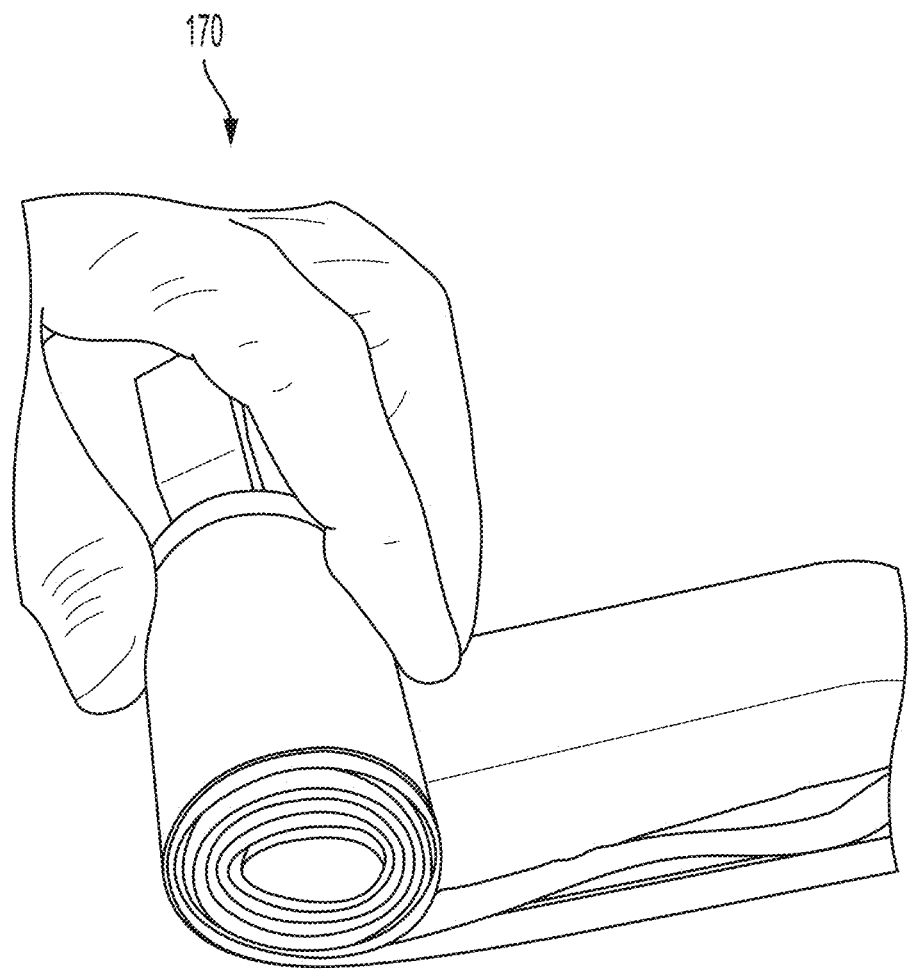
FIG. 6C is an illustration showing a manufacturing step of rolling the layered configuration of FIG. 6B into a spiral to form a spirally wound electric double layer capacitor device, according to some embodiments.
Figure 6D:
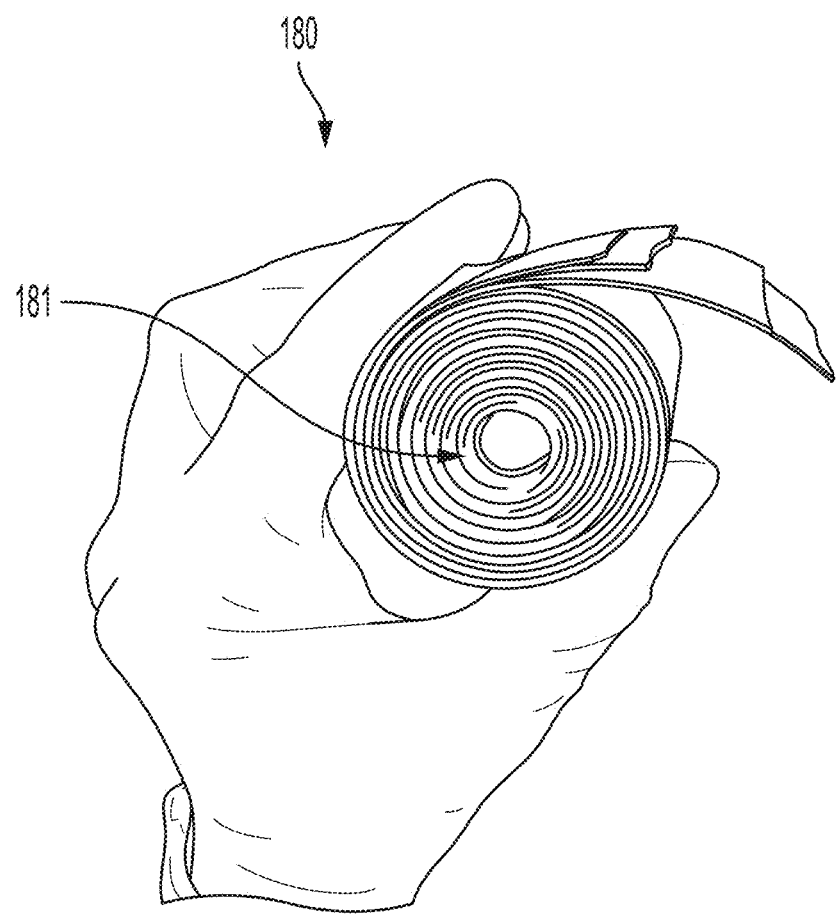
FIG. 6D is an illustration showing a top view of the electric double layer capacitor device assembled as illustrated in FIG. 6C and without casing, according to some embodiments.

Continuing with the manufacturing process, FIG. 6C shows layer 160 as formed into a partially wound spiral 170, with the material arranged in the layers described with regard to FIG. 6B, while FIG. 6D shows the completed spirally wound stack 180.

Figure 6E:
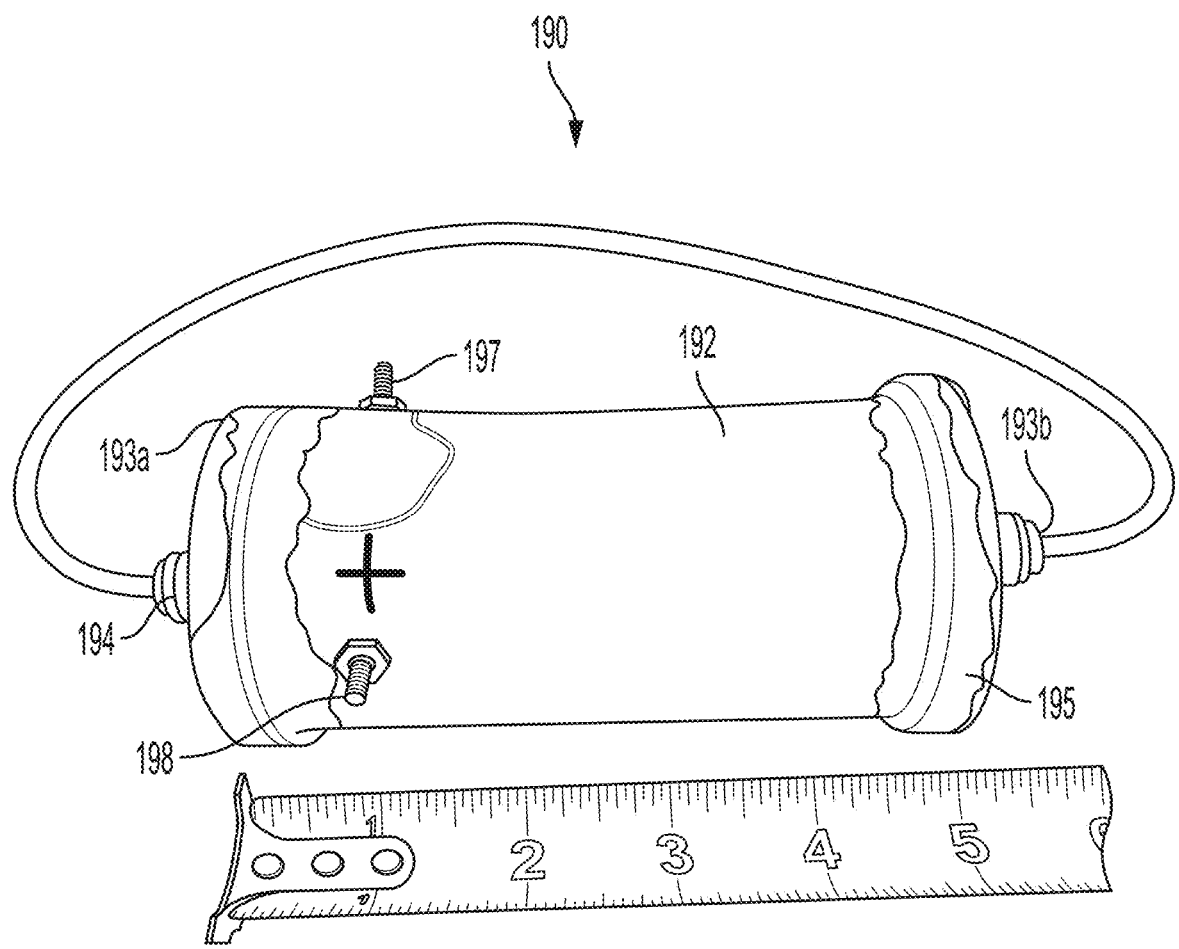
FIG. 6E is an illustration showing the electric double layer capacitor device of FIG. 6D within an outer casing with fluidic and electrical connections as configured for use, according to some embodiments.

FIG. 6E shows the spirally wound stack 180 as assembled into a completed spirally wound capacitive deionization device 190. In the final device 190, the spirally wound stack 180 is encased in a housing 192. In this embodiment, the housing 192 is formed by wrapping a fiberglass material around the spirally wound stack 180 and affixing ends 193a and 193b to formed a water-tight outer containment. External bolts 197 and 198 connect to internal titanium leads 110. Inlet 194 is connectable to a source that delivers water into the device, and outlet 195 delivers treated or brine water (depending on the mode of operation) from the device 190, during operation.

In the embodiment shown in FIGS. 6A-6E, to save space and provide a compact design, there is no inner mandrel around which the layers are spirally wrapped, as is described and illustrated above and as functional and convenient for larger scale devices for reasons previously described. In the exemplary embodiment of FIGS. 6A-6E, eliminating an inner support tube could further facilitate a reduction in the size of the final device, which may desirable in certain applications.

Without being confined to a particular theory, in certain embodiments it is believed that use of a wound titanium (or similar spring or spring-like material biased to resist coiling) layer 120 creates spring-loaded tension on the spiral roll, which may impart a beneficial compression on the stack resulting by the titanium coil attempting to unwind. In this manner, the wound titanium layer (or similarly resilient material, e.g. spring steel or the like) functions in a manner similar to a mainspring in a watch or clock mechanism proving an outwardly bias force in its effort to unwind. This imparted compression can stabilize the layers of the device against the outer casing. Use of a metal such as titanium or stainless steel may allow the spring layer to also function as a current collector layer. The combined spring and current collector layer (e.g., titanium layer) may be sized and positioned to run along a substantial portion of or essentially the entire length of the material coiled to make the radial stack prior to coiling/roll-up into a spiral.

[Device Dimensions]

In some embodiments, one or more features of an electrical double layer capacitor device have selected sizes or dimensions as described below. It should be understood that the sizes and dimensions are purely exemplary and would be scaled and adjusted appropriately depending on the size, capacity, flow/pressure drop/flux characteristics desired, etc.

The thickness of the dielectric spacer may be greater than or equal to 125 microns, greater than or equal to 150 microns, greater than or equal to 200 microns, greater than or equal to 250 microns, greater than or equal to 300 microns, greater than or equal to 350 microns, greater than or equal to 400 microns, or greater than or equal to 450 microns. The thickness of the dielectric spacer may be less than or equal to 500 microns, less than or equal to 450 microns, less than or equal to 400 microns, less than or equal to 350 microns, less than or equal to 300 microns, less than or equal to 250 microns, less than or equal to 200 microns, or less than or equal to 150 microns. Combinations of the above-referenced ranges are also included (e.g., greater than or equal to 125 microns and less than or equal to 500 microns). Other ranges are also possible.

For embodiments were capacitors are wound around a water-impermeable mandrel to form a cylindrical spiral, the spiral may have an inner diameter that is substantially equivalent to the outer diameter of the water-impermeable mandrel. The water-impermeable mandrel may have an outer diameter (and/or the cylindrical spiral may have an inner diameter) of greater than or equal to 1.2 centimeters, greater than or equal to 2.5 centimeters, greater than or equal to 5 centimeters, greater than or equal to 12.5 centimeters, greater than or equal to 18 centimeters, or greater than or equal to 25 centimeters. The water-impermeable mandrel may have an outer diameter (and/or the cylindrical spiral may have an inner diameter) of less than or equal to 30 centimeters, less than or equal to 25 centimeters, less than or equal to 18 centimeters, less than or equal to 12.5 centimeters, less than or equal to 5 centimeters, or less than or equal to 2.5 centimeters. Combinations of the above-referenced ranges are also included (e.g., greater than or equal to 1.2 centimeters and less than or equal to 30 centimeters). Other ranges are also possible.

Capacitors wound to form a cylindrical spiral may form a cylindrical spiral with any of a variety of suitable outer diameters. A cylindrical spiral may have an outer diameter of greater than or equal to 2.5 centimeters, greater than or equal to 5 centimeters, greater than or equal to 12.5 centimeters, greater than or equal to 18 centimeters, greater than or equal to 25 centimeters, greater than or equal to 35 centimeters, or greater than or equal to 43 centimeters. A cylindrical spiral may have an outer diameter of less than or equal to 50 centimeters, less than or equal to 43 centimeters, less than or equal to 35 centimeters, less than or equal to 25 centimeters, less than or equal to 18 centimeters, less than or equal to 12.5 centimeters, or less than or equal to 5 centimeters. Combinations of the above-referenced ranges are also included (e.g., greater than or equal to 2.5 centimeters and less than or equal to 50 centimeters, or greater than or equal to 35 centimeters and less than or equal to 50 centimeters). Other ranges are also possible.

Capacitors wound to form a cylindrical spiral may form a cylindrical spiral with any of a variety of suitable lengths. A cylindrical spiral may have a length of greater than or equal to 6.4 centimeters, greater than or equal to 12.5 centimeters, greater than or equal to 18 centimeters, or greater than or equal to 25 centimeters. A cylindrical spiral may have a length of less than or equal to 35 centimeters, less than or equal to 25 centimeters, less than or equal to 18 centimeters, or less than or equal to 12.5 centimeters. Combinations of the above-referenced ranges are also included (e.g., greater than or equal to 6.4 centimeters and less than or equal to 35 centimeters). Other ranges are also possible.

In some embodiments, an electric double layer capacitor device comprises two or more cylindrical spirals formed from wound capacitors that are positioned serially with respect to each other such that a flow path from an inlet to an outlet passes through the cylindrical spirals sequentially. For example, the flow path may first pass axially through the first cylindrical spiral, and then pass axially through the second cylindrical spiral. In such embodiments, the length of the flow path is equivalent to the sum of the lengths of the cylindrical spirals arranged sequentially along the flow path. In other words, the flow path may have a length that is a multiple of one or more of the ranges described above. In some embodiments, the total length of the flow path from the inlet to the outlet may be greater than or equal to 6.4 centimeters, greater than or equal to 12.5 centimeters, greater than or equal to 18 centimeters, greater than or equal to 25 centimeters, greater than or equal to 35 centimeters, greater than or equal to 50 centimeters, greater than or equal to 75 centimeters, or greater than or equal to 100 centimeters. The distance from the inlet to the outlet along the flow path may be less than or equal to 100 centimeters, less than or equal to 75 centimeters, less than or equal to 50 centimeters, less than or equal to 35 centimeters, less than or equal to 25 centimeters, less than or equal to 18 centimeters, or less than or equal to 12.5 centimeters. Combinations of the above-referenced ranges are also included (e.g., greater than or equal to 6.4 centimeters and less than or equal to 100 centimeters, or greater than or equal to 6.4 centimeters and less than or equal to 35 centimeters). Other ranges are also possible.

In some embodiments, an electric double layer capacitor device comprises electrical connections at each end of the portion of the flow path, which pass through one or more cylindrical spirals formed from wound capacitors (e.g., electrical connections that are spaced apart axially). The electrical connections may be located between the capacitors and, e.g., be provide electrical connection with a controller. The electrical connections may be made by way of metal strips, such as titanium strips, in electrical contact with the capacitors. The electrical connections may be spaced from each other at a distance within one or more of the ranges described above, or at distances slightly in excess of one or more of the ranges described above (e.g., greater than or equal to 6.4 centimeters and less than or equal to 100 centimeters, or greater than or equal to 7.5 centimeters and less than or equal to 100 centimeters).

[Electrodes]

As described herein, electric double layer capacitor devices comprise one or more capacitors. The capacitor(s) may comprise two electrodes separated by a dielectric spacer. The electrodes may be formed from a variety of suitable materials. In some embodiments, the electrodes comprise carbon. Non-limiting examples of types of carbon include carbon black, activated carbon, carbon nanotubes, carbon Bucky-balls, and the like. In some embodiments, a dielectric spacer comprises a pseudo-capacitor material (e.g., a metal oxide) and/or a dopant (e.g., a salt). A capacitor may comprise two electrodes that have the same composition or differing compositions. In devices comprising two or more capacitors, electrodes of the same polarity may have the same composition, or may have differing compositions.

[Ion Specific Layers]

As also described herein, some capacitors comprise one or more ion specific layers or membranes. The ion specific layer may be configured to allow ions of a certain type (e.g., ions of a certain charge quantity, charge type, size, charge density, and/or other feature) to pass therethrough while preventing ions of a different type (e.g., ions of the opposite charge type, or with a different charge quantity, size, charge density, and/or other feature) from passing therethrough. Each ion specific layer may be associated with an electrode. The ion specific layers may be associated with electrodes configured to have the same charge during treatment of aqueous streams as the ions that the ion specific layer is configured to pass. The ion specific layers may be configured to pass ions electrostatically attracted to the electrode on which they are disposed during treatment of the aqueous stream. During regeneration, the ion specific layers may be configured to block ions electrostatically attracted to the electrode on which they are disposed.

In some embodiments, a capacitor comprises a layer that comprises both an ion specific layer and an electrode material. The electrode material may be coated onto a base ion specific layer, such as a membrane. In some embodiments, a capacitor comprises an ion specific layer that is provided separately from the electrodes and from the electrode materials.

The ion specific layer(s) may comprise commercially available ion-selective membrane materials. Commercially available ion-selective membrane materials may comprise a polymeric membrane that has been functionalized to be ion-selective. In some embodiments, an ion specific layer comprises a membrane material that is similar or identical to membrane material commonly employed for electrodialysis applications.

[Current Collectors]

In some embodiments, a capacitor comprises a current collector. For instance, with reference to FIG. 4B, layer 14a and 14b are current collectors. The current collector may be formed together with an electrode. For example, an electrode may be coated onto a current collector, and then allowed to cure. In some embodiments, a current collector is provided separately from any electrodes, and/or separately from any ion specific layers. The current collector may serve as a backing layer. In some embodiments, the current collector is porous. Non-limiting examples of suitable materials for current collectors include metal foils such as titanium (e.g., commercial grade titanium, and/or titanium with a thickness of less than 250 microns) and/or graphoil (e.g., graphoil with a thickness of greater than or equal to 63.5 microns, or greater than or equal to 381 microns).

[Dielectric Spacer]

In some embodiments, a capacitor comprises a dielectric spacer. The dielectric spacer may be positioned between the electrodes therein, and may prevent the electrodes from directly contacting each other and causing a short. In some embodiments, aqueous streams are configured to flow through dielectric spacers positioned within capacitors. In other words, a flow path may pass through a dielectric spacer.

When present, the dielectric spacer can be made of many woven and nonwoven insulating materials such as hemp, nylon cloth, Tenyl, polypropylene, or other non-conductive materials. In some embodiments, the material may wet-out in water with open volume less than 75% and a thickness of greater than or equal to 100 microns, greater than or equal to 125 microns, greater than or equal to 150 microns, greater than or equal to 200 microns, greater than or equal to 250 microns, greater than or equal to 300 microns, greater than or equal to 350 microns, greater than or equal to 400 microns, or greater than or equal to 450 microns. The material may wet-out in water with open volume less than 75% and a thickness of less than or equal to 500 microns, less than or equal to 450 microns, less than or equal to 400 microns, less than or equal to 350 microns, less than or equal to 300 microns, less than or equal to 250 microns, less than or equal to 200 microns, less than or equal to 150 microns, or less than or equal to 125 microns. Combinations of the above-referenced ranges are also included (e.g., greater than or equal to 100 microns and less than or equal to 500 microns, or greater than or equal to 125 microns and less than or equal to 500 microns). Other ranges are also possible.

[Water-Impermeable Mandrel]

In some embodiments, an electric double layer capacitor device comprises a water-impermeable mandrel. The water-impermeable mandrel may be formed of a variety of suitable materials. In some embodiments, the water-impermeable mandrel is formed of a polymer (and/or comprises a polymer), non-limiting examples of which include epoxy resins (e.g., fiber reinforced epoxy resins), polyester resins (e.g., fiber reinforced polyester resins, wound polyester resins), ABS (e.g., schedule 40 or 80 ABS pipe), PVC, PPE, PP, and polymers with semi-rigid structures. In some embodiments, a water-impermeable mandrel is formed of (and/or comprises) a glass cloth.

[Housing]

In some embodiments, an electric double layer capacitor device comprises a housing. The housing may be formed of a variety of suitable materials. In some embodiments, the housing is formed of a polymer (and/or comprises a polymer), non-limiting examples of which include epoxy resins (e.g., fiber reinforced epoxy resins), polyester resins (e.g., fiber reinforced polyester resins, wound polyester resins), ABS (e.g., schedule 40 or 80 ABS pipe), PVC, PPE, PP, and polymers with semi-rigid structures. In some embodiments, a housing is formed of (and/or comprises) a glass cloth and/or fiber glass.

[Control Systems]

According to certain embodiments, a control system and power supply may be incorporated into a system to improve the operation of an electric double layer capacitor device and/or to improve other system components. In other words, certain systems may comprise a control system, a power supply, and an electric double layer capacitor device described herein. The control system may be configured to control the electric double layer capacitor device remotely in some embodiments (e.g., the controlling may be performed by an individual and/or a computer program, and the electric double layer capacitor device may not be in the line of sight of the individual and/or computer program).

When present, the control system may comprise a controller, at least one input device (e.g., a sensor), and/or at least one output device (e.g., a pump and/or valve(s)). The controller may be configured to receive an input signal from the input device and to deliver an output signal, in response to the input signal, to the output device. For example, in certain embodiments, an electric double layer capacitor device may be coupled to a controller configured to receive an input signal from a sensor monitoring a salinity in the reservoir or feed stream, and to deliver an output signal, in response to the input signal, to a pump and/or valve.

Unlike reverse osmosis which can only be fed by its own high pressure pump and produce a single output salinity, in some embodiments the output ion concentration (e.g. salinity) from an electric double layer capacitor device can be adjusted by changing a set point on the controller. This can be helpful to reduce the operating cost of this system. A new output ion concentration (e.g. salinity) may result in changes to the flowrate of the system and/or the set point of the control valve directing treated water to enter the clean tank/pipe. By monitoring the conductivity of the outlet water, the controller can calculate the average ion concentration (e.g. salinity) of the treated water, thereby controlling the ion concentration (e.g. salinity).

Figure 7:
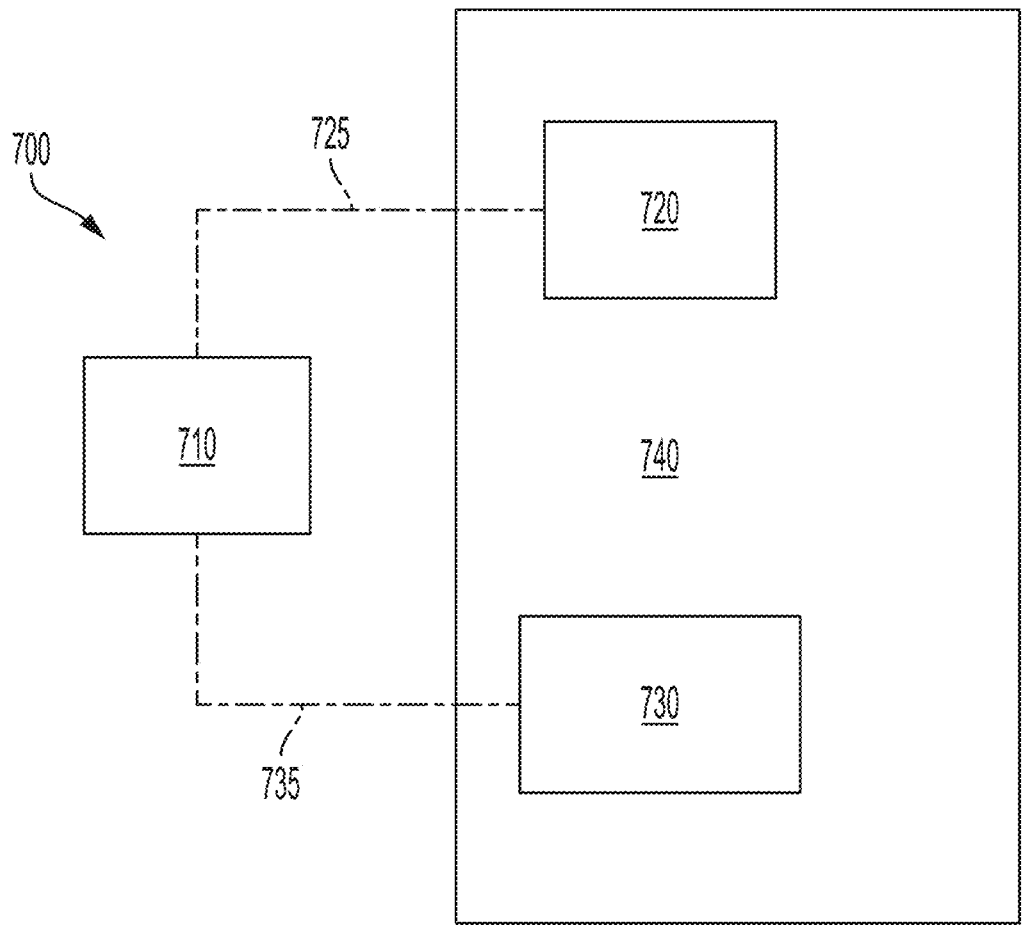
FIG. 7 is a schematic of a control system, according to some embodiments.

For example, FIG. 7 shows a representative control system 700. The control system 700 comprises a controller 710, an input device 720, and an output device 730 coupled together. The controller 710 may receive an input signal 725 from the input device 720 corresponding to a measurement taken by the input device 720. In response to the input signal 725, the controller 710 may deliver an output signal 735 to the output device 730 directing the operation of the output device. In FIG. 7, an electric double layer capacitor device 740 is coupled to the controller 710, so that the controller 710 aids in operations related to the system 740.

The input device 720 may comprise a sensor or monitor. The input device may comprise a sensor configured to monitor a parameter of the system 740. The input device 720 may be placed within or in proximity to the system 740. For example, the input device 720 may comprise an conductivity measurement instrument calibrated to indicate the salinity level within the system. The input device may regularly or continuously transmit the level value to the controller via the input signal 725.

The output device(s) 730 may comprise a device that affects a system parameter. For example, the output device 730 may comprise a pump in fluidic communication with system components and a power supply under control of the controller for applying and adjusting the voltage applied to the electrodes of the capacitive electric double layer capacitor device 740. The output device(s) may be controlled by the controller 710 via output signal 735.

According to some embodiments, the controller comprises a PID controller that operates according to a proportional-integral-derivative control loop. However, other control loop feedback mechanisms may be used, as would be understood by a person of ordinary skill in the art.

In some embodiments, an input sensor may comprise a sensor monitoring the inlet conductivity of feed water to the electric double layer capacitor device. By monitoring inlet conductivity, the electric double layer capacitor device can optimize performance by adjusting applied voltage, controlling outlet conductivity, energy usage, flowrate, uptime, etc. The monitoring is performed remotely in some embodiments (e.g., the monitoring may be performed by an individual and/or a computer program, and the electric double layer capacitor device may not be in the line of sight of the individual and/or computer program).

In some embodiments, an input sensor may comprise sensors monitoring the inlet and outlet conductivity of water from the electric double layer capacitor device and water demand of other system components. By monitoring these, the electric double layer capacitor device can optimize performance by adjusting outlet conductivity, energy usage, flowrate, uptime, etc.

In some embodiments, operating in a "feed and bleed" configuration, the conductivity of water in the reservoir is monitored and used to control how long water is recycled through the electric double layer capacitor device.

In some embodiments, voltage and/or current applied to the capacitive deionization device is monitored and when it falls below a set point, indicating that the capacitors are approaching capacity for ionic adsorption, the device then switches into the brine reject mode to restore the capacitors.

In some embodiments, change from treatment mode to reject mode is based on a timer control. In other words, the time duration of the clean and reject cycles are controlled by a preset timer.

In some embodiments, the electric double layer capacitor device may be operated on constant voltage or constant current operation When the electric double layer capacitor device is operated in a constant voltage mode, the amperage drops as capacitors fill with ionic species. In a constant current mode, the voltage increases as capacitors fill with ionic species. The device could also be operated in a constant power mode, where the amps and/or volts are controlled to impart a constant power to the capacitor.

By monitoring key aspects of system performance, the electric double layer capacitor device may be shut off when needed, saving water, energy, and maintenance.

As described above, certain embodiments of the inventive systems include one or more computer implemented control systems (programmable logic controllers, or PLC's) for operating various components of the water treatment system, (e.g., controller 710 of the computer implemented control system 700 shown in FIG. 7). In general, any calculation methods, steps, simulations, algorithms, systems, and system elements described herein may be implemented and/or controlled using one or more computer implemented control system(s), such as the various embodiments of computer implemented systems described below. The methods, steps, control systems, and control system elements described herein are not limited in their implementation to any specific computer system, as many different machines may be used.

The computer implemented control system can be part of or coupled in operative association with a spiral capacitive deionization device unit and/or water processing unit of a system and/or other automated system components, and, in some embodiments, is configured and/or programmed to control and adjust operational parameters, as well as analyze and calculate values. In some embodiments, the computer implemented control system(s) can send and receive reference signals to set and/or control operating parameters of system apparatus. In other embodiments, the computer implemented system(s) can be separate from and/or remotely located with respect to the other system components.

Some embodiments of the described systems and methods disclosed herein provide a flexibility associated with an adjustable output ion concentration (e.g. salinity) and variable inlet ion concentration (e.g. salinity). Unlike reverse osmosis which can only product a single output salinity, certain embodiments of the miniature capacitive deionization device systems can adjust the output salinity by simply changing a set point on a controller (e.g. a conductivity sensor and controller). This can be helpful to reduce the operating cost of this system.

[Device Properties]

In some embodiments, an electric double layer capacitor herein may perform particularly well according to one or more metrics. For instance, in some embodiments, an electric double layer capacitor may have a relatively low pressure drop from an inlet to an outlet. The pressure drop from the inlet to the outlet may be, for instance, less than or equal to 1 psi per square meter of the cross-section of the total open flow path, less than or equal to 0.5 psi per square meter, less than or equal to 0.3 psi per square meter, less than or equal to 0.25 psi per square meter, less than or equal to 0.2 psi per square meter, or less than or equal to 0.15 psi per square meter. The pressure drop from the inlet to the outlet may be greater than or equal to 0.1 psi per square meter of the cross-section of the total open flow path, greater than or equal to 0.15 psi per square meter, greater than or equal to 0.2 psi per square meter, greater than or equal to 0.25 psi per square meter, greater than or equal to 0.3 psi per square meter, or greater than or equal to 0.5 psi per square meter. Combinations of the above-referenced ranges are also included (e.g., greater than or equal to 0.1 psi and less than or equal to 1 psi per square meter, greater than or equal to 0.15 and less than or equal to 0.5 psi per square meter, or greater than or equal to 0.2 and less than or equal to 0.3 psi per square meter). Other ranges are also possible. The pressure drop measurements references herein are made under flow conditions where a volumetric flow rate of an aqueous stream through the device is 10 gpm and for electric double layer capacitor devices for which the one or more capacitors have an active area of at least 12 m². The pressure drop from the inlet to the outlet may be less than or equal to 5 psi per cylindrical spiral formed by one or more capacitors, and/or less than or equal to 5 psi per RDI module (i.e., less than or equal to 5 psi per cylindrical spiral).

In some embodiments, an electrical resistance of the electric double layer capacitor device may be relatively low. The electrical resistance of the electric double layer capacitor device may be less than or equal to 20 milliΩ, less than or equal to 15 milliΩ, or less than or equal to 10 milliΩ.

In some embodiments, a variance of an electrical resistance of the electric double layer capacitor device may be relatively low. The variance of the electrical resistance of the electric double layer capacitor device may be less than or equal to 5% of a total electrical resistance of the electric double layer capacitor device. The variance of the electrical resistance of the electric double layer capacitor device may be determined by measuring the resistance of multiple double layer capacitor devices, and then determining the standard deviation and variance.

Electric double layer capacitor devices described herein may be configured to be operated at a variety of currents. The electric double layer capacitor devices may be configured to be operated at a current of less than or equal to 1,000 A, less than or equal to 750 A, less than or equal to 500 A, or less than or equal to 200 A. The electric double layer capacitor devices may be configured to be operated at a current of greater than or equal to 50 A, greater than or equal to 100 A, greater than or equal to 200 A, greater than or equal to 500 A, or greater than or equal to 750 A. Combinations of the above-referenced ranges are also included (e.g., less than or equal to 1000 A and greater than or equal to 50 A, or less than or equal to 200 A and greater than or equal to 50 A). Other ranges are also possible Electric double layer capacitor devices described herein may be configured to be operated at a variety of voltages. The electric double layer capacitor devices may be configured to be operated at a voltage of less than or equal to 2.2 V, less than or equal to 2.0 V, less than or equal to 1.75 V, less than or equal to 1.5 V, less than or equal to 1.25 V, less than or equal to 1.0 V, less than or equal to 0.75 V, or less than or equal to 0.5 V. The electric double layer capacitor devices may be configured to be operated at a voltage of greater than or equal to 0.25 V, greater than or equal to 0.5 V, greater than or equal to 0.75 V, greater than or equal to 1.0 V, greater than or equal to 1.25 V, greater than or equal to 1.5 V, greater than or equal to 1.75 V, or greater than or equal to 2.0 V. Combinations of the above-referenced ranges are also included (e.g., less than or equal to 2.2 V and greater than or equal to 0.25 V, or less than or equal to 2.0 V and greater than or equal to 1.0 V). Other ranges are also possible.

[Ions that May be Removed]

As described herein, electric double layer capacitor devices may be configured to remove one or more ions from aqueous streams. Non-limiting examples of such ions include Li, Na, Ca, Mg, K, U, Hg, Se, Ba, Sr, Fe, Mn, Cr, Ni, Cu, Zn, Sn, Sb, Pb, chlorides, sulfates, sulfides, sulfites, nitrates, phosphates, carbonates, borates, silica, selenates, selanites, bromides, iodides, and alkalines. In some embodiments, an electric double layer capacitor device is configured to remove a hardness ion.

[Description of Connectivity]

Various of the unit operations described herein can be "directly fluidically connected" to other unit operations and/or components. Generally, a direct fluid connection exists between a first unit operation and a second unit operation (and the two unit operations are said to be "directly fluidically connected" to each other) when they are fluidically connected to each other and the composition of the fluid does not substantially change (i.e., no fluid component changes in relative abundance by more than 5% and no phase change occurs) as it is transported from the first unit operation to the second unit operation. As an illustrative example, a stream that connects first and second unit operations, and in which the pressure and temperature of the fluid is adjusted but the composition of the fluid is not altered, would be said to directly fluidically connect the first and second unit operations. If, on the other hand, a separation step is performed and/or a chemical reaction is performed that substantially alters the composition of the stream contents during passage from the first component to the second component, the stream would not be said to directly fluidically connect the first and second unit operations.

The electric double layer capacitor devices as illustrated and described can be configured and arranged to operate individually in certain embodiments and in other embodiments may be combined in series and/or parallel in a multi-unit system to, for example, increase total capacity, degree of removal of ions, customization for particular on contaminates, and the like. It should also be understood that the electric double layer capacitor devices as illustrated and described herein may be combined or integrated with other unit operations and/or water treatment devices in certain embodiments, such as cooling tower systems (e.g., as described in U.S. patent application Ser. No. 15/821,522, filed Nov. 22, 2017, and entitled "Water Treatment Systems and Methods Using Radial Deionization", which is incorporated herein in its entirety for all purposes), humidification devices and systems (e.g., as described in U.S. patent application Ser. No. 15/839,725, filed Dec. 12, 2017, and entitled "Miniature Capacitive Deionization Devices and Related Systems and Methods", which is incorporated herein in its entirety for all purposes), and other types of devices and systems (e.g., drinking water purifiers, water softeners, clothes laundering machines, dishwashers, coffee/hot beverage makers, ice makers, DI water generators for laboratories, hot water heater demineralizers, point of entry desalination devices for home use as also described in U.S. patent application Ser. No. 15/839,725).

It should also be understood that, where separate units are shown in the figures and/or described as performing a sequence of certain functions, the units may also be present as a single unit (e.g., within a common housing), and the single unit may perform a combination of functions.

It should also be understood that a number of different unit operations, not shown in any of the figures, may be performed at various stages of the system either upstream or downstream of a deionization device.

The following examples are intended to illustrate certain embodiments of the present invention, but do not exemplify the full scope of the invention.

Example 1

This Example compares the performance of electric double layer capacitor devices differing only in capacitor geometry. One set of electric double layer capacitor devices comprises two capacitors forming a cylindrical spiral around a water-impermeable mandrel (in a "spiral design"). The other comprises concentric cylindrical capacitors nested around a water-impermeable mandrel (in a "concentric design"). When both electric double layer capacitor devices were operated under similar conditions, those with the spiral design exhibited a lower level of electrical resistance and higher flux for a given level of ion removal than those with the concentric design.

Each electric double layer capacitor device had an outer diameter of the water-impermeable mandrel of 21.2725 cm, an outer diameter of 29.21 cm, and a length of 53.34 cm. Each electric double layer capacitor device included electrodes with a total area of 12 $m^2$, anionic ion specific layers with a total area of 6 $m^2$, and cationic ion specific layers with a total area of 6 $m^2$. The electrodes were charged by two power supplies (2-SPV-1500-12), each operated at 2.2 V. Each power supply was capable of outputting 125 A of current, for a possible total current output of 250 A. The electric double layer capacitor devices also included inlet feed streams with an ionic concentration characterized by an average conductivity of 650 µS.

The electric double layer capacitor devices were operated on a cycle comprising a 5 minute positive polarity cleaning step, during which the electrodes were held at a first set of polarities, followed by a 5 minute reject step, when the polarities on the electrodes were reversed. Aqueous streams were delivered to the electric double layer capacitor devices by a positive displacement pump (Procon) at an average flow rate of 11 L/min and an average pressure of 9 psi.

The performance of each electric double layer capacitor device was assessed by determining the calculated flux based on the measured conductivity of the treated aqueous stream delivered by the electric double layer capacitor device and comparing it to the flux predicted by a statistical model formulated for electric double layer capacitor devices with a concentric design. The statistical model was formulated based on experiments performed on aqueous streams with initial levels of salinity between 325 ppm and 975 ppm and flow rates between 570 mL/(min*$m^2$) and 1700 mL/(min*$m^2$). It was found to have an accuracy of greater than 99% for electric double layer capacitors with a concentric design.

Table 1, below, shows the operating current, operating voltage, estimated resistance, and difference between the calculated flux of the spiral design electric double layer capacitor devices and the flux predicted by the model formulated for concentric design electric double layer capacitor devices (expressed as a percentage of the predicted flux). The flux was the average flux over the 5 minute positive polarity cleaning step.

TABLE 1

| Device no. | Operating current (A) | Operating Voltage (V) | Estimated resistance (milliΩ) | Difference between calculated flux and predicted flux |
|---|---|---|---|---|
| 1 | 130.7 | 1.98 | 15.18 | 29.7% |
| 2 | 131.7 | 2.03 | 15.38 | 22.3% |
| 3 | 135.0 | 12.00 | 14.81 | 28.3% |
| 4 | 135.8 | 1.96 | 14.43 | 32.2% |
| 5 | 140.5 | 1.92 | 13.64 | 22.5% |
| 6 | 139.8 | 2.00 | 14.30 | 36.9% |
| Average | 135.6 | 2.0 | 14.6 | 28.6% |
| Standard deviation | 4.05 | 0.04 | 0.64 | 5.6% |
| Variance | 16.42 | 0.00 | 0.40 | 0.3% |
| +2.0 sigma high | 143.7 | 2.1 | 15.9 | 39.9% |
| −2.0 sigma low | 127.5 | 1.9 | 13.4 | 17.4% |

Table 2, below, shows the operating current, operating voltage, estimated resistance, and difference between the calculated flux of the concentric design electric double layer capacitor devices and the flux predicted by the model formulated for concentric design electric double layer capacitor devices (expressed as a percentage of the predicted flux). The flux was the average flux over the 5 minute positive polarity cleaning step.

TABLE 2

| Device no. | Operating current (A) | Operating Voltage (V) | Estimated resistance (milliΩ) | Difference between calculated flux and predicted flux |
|---|---|---|---|---|
| 1 | 9.19 | 1.8 | 19.59 | 14.6% |
| 2 | 104.8 | 1.74 | 36.60 | 2.6% |
| 3 | 101 | 1.78 | 17.62 | −11.3% |
| 4 | 110.4 | 1.4 | 12.68 | −2.3% |
| 5 | 106.4 | 1.7 | 15.98 | −6.7% |
| 6 | 104 | 1.74 | 16.73 | 10.4% |
| 7 | 109.47 | 1.5 | 13.70 | −13.1% |
| 8 | 101.1 | 1.74 | 17.21 | −7.9% |
| 9 | 105.6 | 1.7 | 16.10 | −12.8% |
| 10 | 108.2 | 1.7 | 15.71 | 3.1% |
| 11 | 111.4 | 1.7 | 15.26 | −15.4% |
| 12 | 106.62 | 1.74 | 16.32 | −8.9% |
| 13 | 104 | 1.78 | 17.12 | −5.2% |
| 14 | 103.8 | 1.76 | 16.96 | −2.7% |
| 15 | 107.2 | 1.74 | 16.23 | 5.2% |
| 16 | 109.3 | 1.7 | 15.55 | 2.3% |
| 17 | 99.2 | 1.66 | 16.73 | 0.5% |
| 18 | 106.4 | 1.72 | 16.17 | −16.9% |
| 19 | 104.3 | 1.72 | 16.49 | −3.5% |
| 20 | 103.9 | 1.7 | 16.36 | 3.6% |
| 21 | 109.4 | 1.72 | 15.72 | 3.1% |
| 22 | 105.9 | 1.72 | 16.24 | 7.0% |
| 23 | 102.9 | 1.74 | 16.91 | 3.0% |
| 24 | 109.3 | 1.72 | 15.74 | 1.0% |
| Average | 105.3 | 1.7 | 16.2 | −2.1% |
| Standard deviation | 4.24 | 0.09 | 128 | 8.3% |
| Variance | 17.98 | 0.01 | 1.65 | 0.7% |
| +2.0 sigma high | 113.8 | 1.9 | 18.8 | 14.4% |
| −2.0 sigma low | 96.8 | 1.5 | 13.7 | −18.6% |

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively.

What is claimed is:

1. An electric double layer capacitor device for use in treating an aqueous stream by capacitive deionization, comprising:

an inlet to receive the aqueous stream;

an outlet for delivering a treated aqueous stream; and one or more capacitors positioned within a housing and defining a flow path between and in fluid communication with the inlet and the outlet and configured to produce the treated aqueous stream, wherein each of the one or more capacitors comprises:

a first electrode;

a first ion specific layer associated with the first electrode;

a second electrode spaced apart from the first electrode;

a second ion specific layer associated with the second electrode; and a dielectric spacer forming the flow path positioned between the first ion specific layer and the second ion specific layer and configured to receive a portion of the aqueous stream from the inlet and deliver a portion of the treated aqueous stream to the outlet;

wherein the one or more capacitors form a cylindrical spiral having a centrally disposed axis about which the one or more capacitors are wound; and wherein the inlet, outlet, and one or more capacitors are configured to cause the aqueous stream to flow within the flow path between the first ion specific layer and the second ion specific layer in an axial direction from the inlet to the outlet through the flow path.

2. An electric double layer capacitor device for use in treating an aqueous stream by capacitive deionization, comprising:
an inlet to receive the aqueous stream;
an outlet for delivering a treated aqueous stream; and
at least a first capacitor and a second capacitor positioned within a housing and defining a flow path between and in fluid communication with the inlet and the outlet and configured to produce the treated aqueous stream, wherein each of the first and second capacitors comprises:
a first electrode;
a first ion specific layer associated with the first electrode;
a second electrode spaced apart from the first electrode;
a second ion specific layer associated with the second electrode; and
a dielectric spacer forming the flow path positioned between the first ion specific layer and the second ion specific layer and configured to receive a portion of the aqueous stream from the inlet and deliver a portion of the treated aqueous stream to the outlet;
wherein the first and second capacitors form a cylindrical spiral having a centrally disposed axis about which the one or more capacitors are wound; and
wherein the first and second capacitors as arranged in the cylindrical spiral form a layer structure such that the first electrode of the first capacitor is in electrical contact with the first electrode of the second capacitor and the second electrode of the first capacitor is in electrical contact with the second electrode of the first capacitor.

3. A method of forming an electric double layer capacitor device for use in treating an aqueous stream by capacitive deionization, comprising:
winding at least a first capacitor disposed on a second capacitor to form a cylindrical spiral, wherein each of the first and second capacitors comprises:
a first electrode;
a first ion specific layer associated with the first electrode;
a second electrode spaced apart from the first electrode;
a second ion specific layer associated with the second electrode; and
a dielectric spacer forming a flow path positioned between the first ion specific layer and the second ion specific layer and configured to receive a portion of the aqueous stream from an inlet and deliver a portion of the treated aqueous stream to an outlet;
wherein prior to winding and as wound, the first capacitor and the second capacitor are disposed upon each other such that the first electrode of the first capacitor is in electrical contact with the first electrode of the second capacitor.

4. An electric double layer capacitor device for use in treating an aqueous stream by capacitive deionization, comprising:
a cylindrical housing enclosing a volume bounded by an outer cylindrical surface, and a water-impermeable inner tubular mandrel defining a lumen;
an inlet positioned within the lumen and penetrating the water-impermeable inner tubular mandrel to receive the aqueous stream from a source and to direct the aqueous stream into the volume;
an outlet for positioned within the lumen and penetrating the water-impermeable inner tubular mandrel delivering a treated aqueous stream positioned to direct the treated aqueous stream out of the volume to a destination; and wherein the volume contains:
one or more capacitors defining a flow path between and in fluid communication with the inlet and the outlet and configured to produce the treated aqueous stream, wherein each of the one or more capacitors comprises:
a first electrode;
a first ion specific layer associated with the first electrode;
a second electrode spaced apart from the first electrode;
a second ion specific layer associated with the second electrode; and
a dielectric spacer forming the flow path positioned between the first ion specific layer and the second ion specific layer and configured to receive a portion of the aqueous stream from the inlet and deliver a portion of the treated aqueous stream to the outlet; and
wherein the one or more capacitors form a cylindrical spiral having a centrally disposed axis about which the one or more capacitors are wound.

5. An electric double layer capacitor device for use in treating an aqueous stream by capacitive deionization, comprising:
an inlet to receive the aqueous stream;
an outlet for delivering a treated aqueous stream; and
one or more capacitors positioned within a housing and defining a flow path between and in fluid communication with the inlet and the outlet and configured to produce the treated aqueous stream, wherein each of the one or more capacitors comprises:
a first electrode;
a first ion specific layer associated with the first electrode;
a second electrode spaced apart from the first electrode;
a second ion specific layer associated with the second electrode; and
a dielectric spacer forming the flow path positioned between the first ion specific layer and the second ion specific layer and configured to receive a portion of the aqueous stream from the inlet and deliver a portion of the treated aqueous stream to the outlet;
wherein the dielectric spacer has a thickness of greater than or equal to 125 microns; and
wherein the one or more capacitors form a cylindrical spiral having a centrally disposed axis about which the one or more capacitors are wound.

6. An electric double layer capacitor device for use in treating an aqueous stream by capacitive deionization, comprising:
an inlet to receive the aqueous stream;
an outlet for delivering a treated aqueous sham; and
one or more capacitors positioned within a housing and defining a flow path between and in fluid communication with the inlet and the outlet and configured to produce the treated aqueous stream, wherein each of the one or more capacitors comprises:
a first electrode;
a first ion specific layer associated with the first electrode;
a second electrode spaced apart from the first electrode;
a second ion specific layer associated with the second electrode; and
a dielectric spacer forming the flow path positioned between the first ion specific layer and the second ion specific layer and configured to receive a portion of the aqueous stream from the inlet and deliver a portion of the treated aqueous stream to the outlet;

wherein a pressure drop from the inlet to the outlet is less than or equal to 0.25 psi per square meter of a cross-sectional area of the flow path for a volumetric flow rate of the aqueous stream through the electric double layer capacitor device of at least 10 gpm, wherein the one or more capacitors of the electric double layer capacitor device have an active area of at least 12 $m^2$; and wherein the one or more capacitors form a cylindrical spiral having a centrally disposed axis about which the one or more capacitors are wound.

7. An electric double layer capacitor device for use in treating an aqueous stream by capacitive deionization, comprising:

an inlet to receive the aqueous stream;

an outlet for delivering a treated aqueous stream; and one or more capacitors positioned within a housing and defining a flow path between and in fluid communication with the inlet and the outlet and configured to produce the treated aqueous stream, wherein each of the one or more capacitors comprises:

a first electrode;

a first ion specific layer associated with the first electrode;

a second electrode spaced apart from the first electrode;

a second ion specific layer associated with the second electrode; and a dielectric spacer forming the flow path positioned between the first ion specific layer and the second ion specific layer and configured to receive a portion of the aqueous stream from the ink and deliver a portion of the treated aqueous stream to the outlet; and a water-impermeable mandrel;

wherein the one or more capacitors form a spiral around the water-impermeable mandrel.

* * * * *